(12) United States Patent
Ito et al.

(10) Patent No.: US 12,729,962 B2
(45) Date of Patent: Sep. 8, 2026

(54) INERTIAL SENSOR

(71) Applicants: DENSO CORPORATION, Kariya-city (JP); TOYOTA JIDOSHA KABUSHIKI KAISHA, Toyota (JP); MIRISE Technologies Corporation, Nisshin (JP)

(72) Inventors: Keitaro Ito, Nisshin (JP); Shota Harada, Nisshin (JP); Katsuaki Goto, Nisshin (JP); Yuuki Inagaki, Nisshin (JP); Hideaki Nishikawa, Nisshin (JP); Takahiko Yoshida, Nisshin (JP); Yusuke Kawai, Nisshin (JP)

(73) Assignees: DENSO CORPORATION, Kariya-city (JP); TOYOTA JIDOSHA KABUSHIKI KAISHA, Toyota (JP); MIRISE Technologies Corporation, Nisshin (JP)

( * ) Notice: Subject to any disclaimer, the term of this patent is extended or adjusted under 35 U.S.C. 154(b) by 167 days.

(21) Appl. No.: 18/659,102

(22) Filed: May 9, 2024

(65) Prior Publication Data

US 2024/0401948 A1 Dec. 5, 2024

(30) Foreign Application Priority Data

Jun. 1, 2023 (JP) ................................ 2023-090967

(51) Int. Cl.
*G01C 19/5712* (2012.01)

(52) U.S. Cl.
CPC ................................ *G01C 19/5712* (2013.01)

(58) Field of Classification Search
CPC .. G01C 19/5712; G01C 19/5691; G01C 1/00; G01C 21/16; B81B 7/02; B81B 2201/0228; G01P 15/125
See application file for complete search history.

(56) References Cited

U.S. PATENT DOCUMENTS 10,520,331 B2 12/2019 Weinberg et al.
10,612,925 B2 4/2020 Najafi et al.
11,874,112 B1 * 1/2024 Cho .................. G01C 19/5712
12,143,095 B2 * 11/2024 Endou .................... H03H 9/125
2012/0227497 A1 9/2012 Eudier et al.
2016/0123734 A1 * 5/2016 Nakagawa ......... G01C 19/5621 73/504.16
2016/0334214 A1 * 11/2016 Saito ................. G01C 19/5691
2017/0234725 A1 * 8/2017 Ichikawa .............. G01H 11/00 73/658
2019/0064205 A1 * 2/2019 Tocchio ................ G01P 15/125
2021/0123736 A1 * 4/2021 Ozawa .............. G01C 19/5649

* cited by examiner

*Primary Examiner* — Francis C Gray
(74) *Attorney, Agent, or Firm* — Posz Law Group, PLC

(57) ABSTRACT

An inertial sensor includes a resonator, a mounting board, and an actuator. The resonator has a first drive mode and a second drive mode. The mounting board has a plurality of electrode portions arranged at a distance from each other and surrounding the resonator. The actuator is configured to vibrate in a z-axis direction. The z-axis direction is a direction orthogonal to a planar direction of the mounting board. The actuator is further configured to vibrate the resonator in the z-axis direction to cause a resonance mode.

8 Claims, 17 Drawing Sheets

Figure 5:
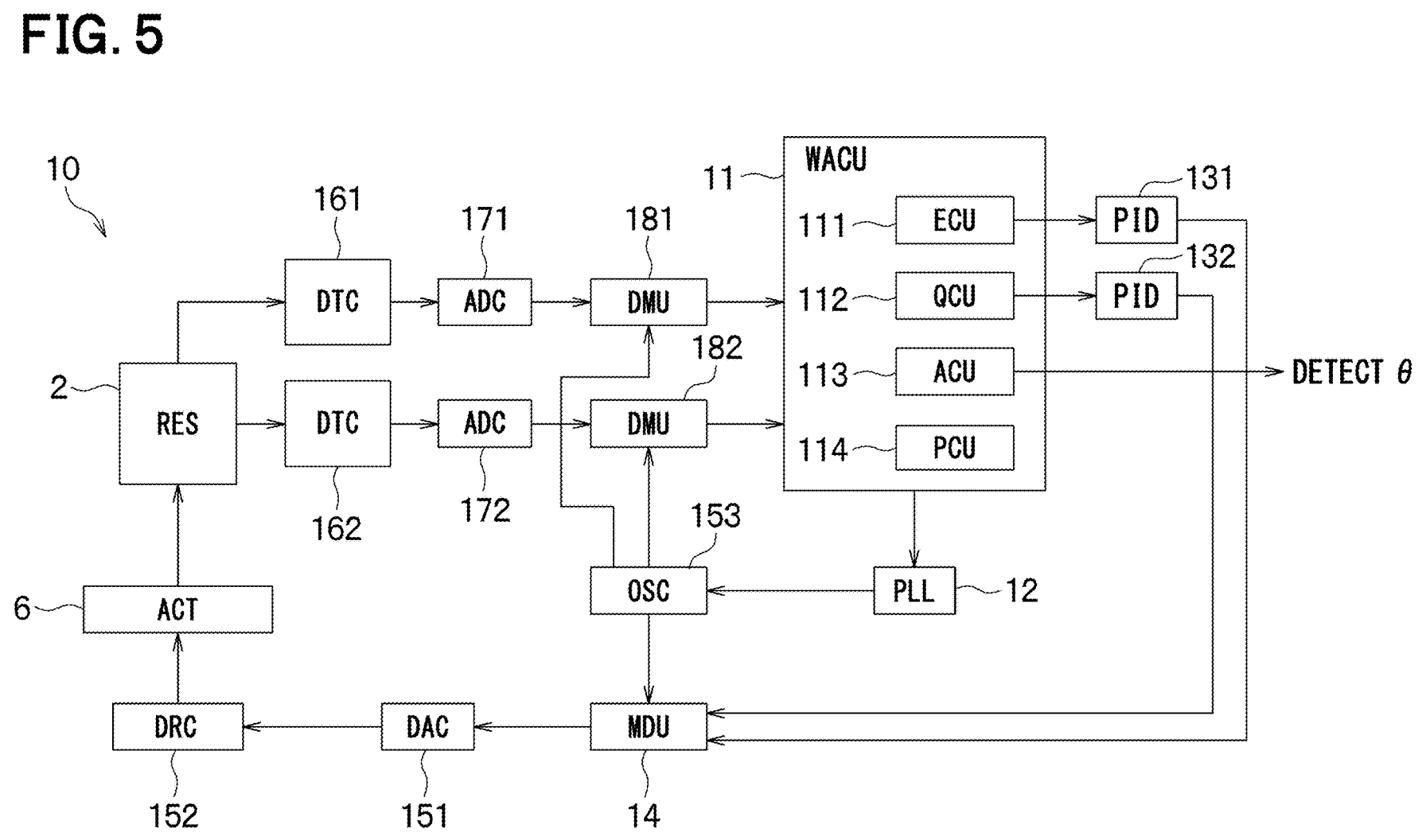

10
2 RES
6 ACT
152 DRC
151 DAC
14 MDU
153 OSC
12 PLL
161 DTC
162 DTC
171 ADC
172 ADC
181 DMU
182 DMU
11 WACU
111 ECU
112 QCU
113 ACU
114 PCU
131 PID
132 PID
DETECT θ

Figure 7:
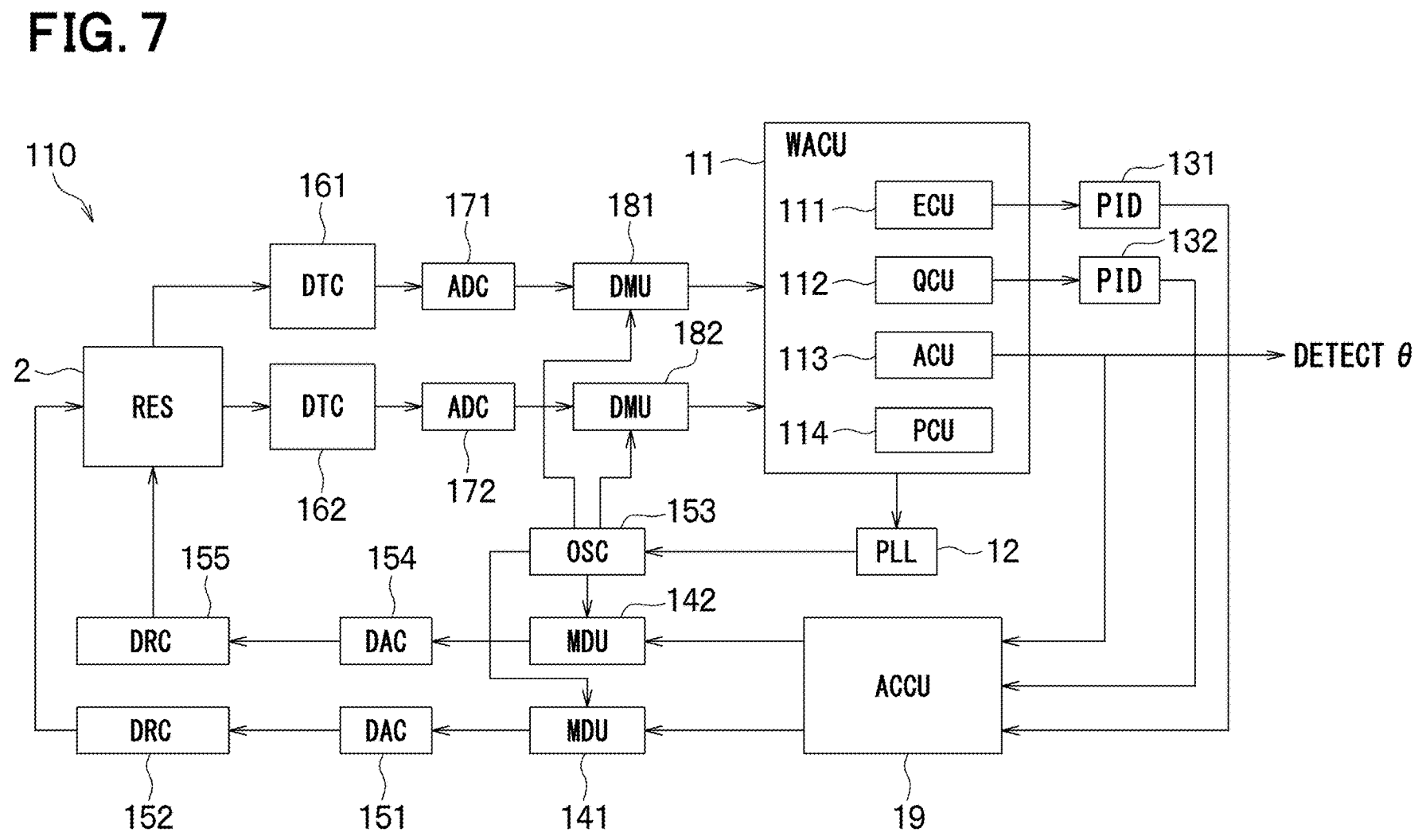

110
2 RES
161 DTC
162 DTC
171 ADC
172 ADC
181 DMU
182 DMU
11 WACU
111 ECU
112 QCU
113 ACU
114 PCU
12 PLL
131 PID
132 PID
DETECT θ
153 OSC
142 MDU
141 MDU
154 DAC
151 DAC
155 DRC
152 DRC
19 ACCU

INERTIAL SENSOR

CROSS REFERENCE TO RELATED APPLICATION

The present application claims the benefit of priority from Japanese Patent Application No. 2023-090967 filed on Jun. 1, 2023. The entire disclosure of the above application is incorporated herein by reference.

TECHNICAL FIELD

The present disclosure relates to an inertial sensor.

BACKGROUND

In recent years, a system for autonomous driving of a vehicle has been developed. This type of system requires a highly accurate self-position estimation technique. For example, a self-position estimation system including GNSS and IMU has been developed for so-called level 3 autonomous driving. GNSS is abbreviation for Global Navigation Satellite System. IMU is abbreviation for Inertial Measurement Unit, and is, for example, a six-axis inertial sensor including a three-axis gyro sensor and a three-axis acceleration sensor. In the future, in order to realize a level 4 or higher autonomous driving, IMU with higher accuracy than the current one is required.

SUMMARY

The present disclosure provides an inertial sensor including a resonator, a mounting board, and an actuator. The resonator has a first drive mode and a second drive mode. The mounting board has a plurality of electrode portions arranged at a distance from each other and surrounding the resonator. The actuator is configured to vibrate in a z-axis direction. The z-axis direction is a direction orthogonal to a planar direction of the mounting board. The actuator is further configured to vibrate the resonator in the z-axis direction to cause a resonance mode.

BRIEF DESCRIPTION OF DRAWINGS

Objects, features and advantages of the present disclosure will become apparent from the following detailed description made with reference to the accompanying drawings. In the drawings:

FIG. 1 is a cross-sectional view showing an inertial sensor according to a first embodiment;

FIG. 5 is a block diagram showing a control circuit in a whole angle mode including the inertial sensor according to the first embodiment;

FIG. 6 is a cross-sectional view showing an inertial sensor of a comparative example;

FIG. 7 is a block diagram showing a control circuit in a whole angle mode including the inertial sensor of the comparative example;

FIG. 8 is a cross-sectional view showing an inertial sensor according to a second embodiment;

FIG. 9 is a cross-sectional view showing an inertial sensor according to a third embodiment;

FIG. 11 is a cross-sectional view showing an inertial sensor according to a fifth embodiment;

FIG. 12 is a cross-sectional view showing an inertial sensor according to a sixth embodiment;

DETAILED DESCRIPTION

Figure 2:
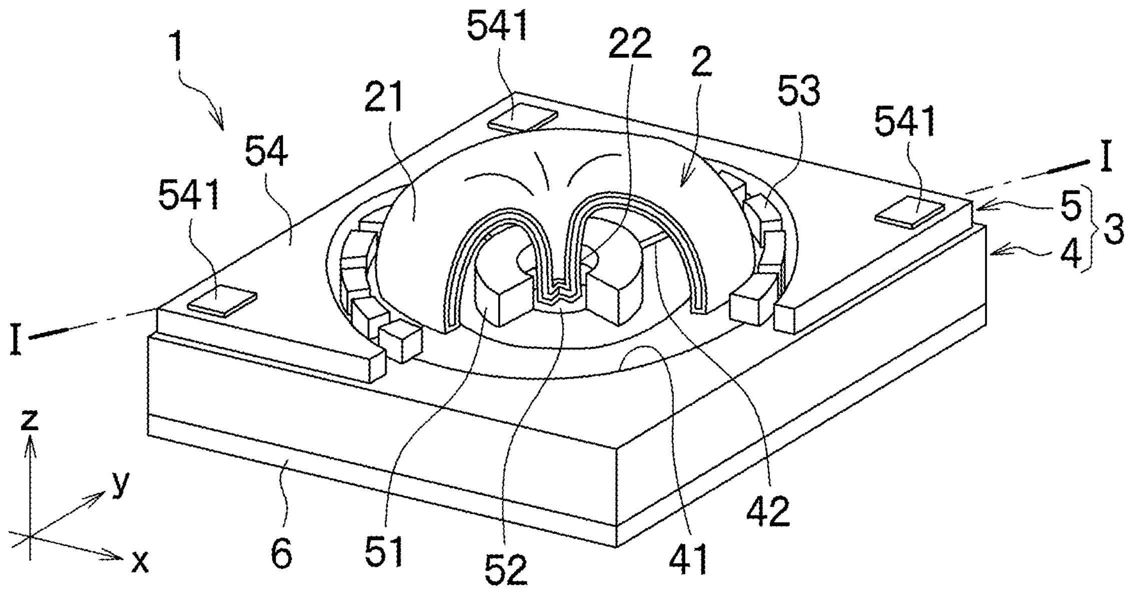
FIG. 2 is a perspective sectional view showing a portion of the inertial sensor in FIG. 1 that is accommodated in a package.

Next, a relevant technology is described only for understanding the following embodiments. An inertial sensor according to the relevant technology includes a resonator as a vibrating body and a substrate on which a plurality of electrodes is formed. The electrodes are arranged apart from each other along a circumferential direction around the resonator and surround the resonator at a predetermined distance. The inertial sensor causes the resonator to resonate in a first vibration mode and a second vibration mode in a planar direction of the substrate by an electrostatic force from some of the electrodes, and detects an angle of rotation applied to the resonator based on a change in electrostatic capacitance between the resonator and the electrodes.

In order to operate this type of inertial sensor in a whole angle mode, it is necessary to perform control for making an amplitude of the resonator constant, control for making a quadrature error between a first drive axis and a second drive axis zero, control for feeding back a measured angle, and control for maintaining resonance. In the control in the whole angle mode, the angle detection accuracy may be reduced due to the influence of an error in obtaining the direction of the vibration standing wave, a time delay in calculation, a drift due to a drive gain difference between the first drive axis and the second drive axis, and the like.

An inertial sensor according to an aspect of the present disclosure includes a resonator, a mounting board, and an actuator. The resonator has a first drive mode and a second drive mode. The mounting board has a plurality of electrode portions arranged at a distance from each other and surrounding the resonator. The actuator is configured to vibrate in a z-axis direction. The z-axis direction is a direction orthogonal to a planar direction of the mounting board. The actuator is further configured to vibrate the resonator in the z-axis direction to cause a resonance mode.

According to this aspect, the inertial sensor includes the resonator having the first drive mode and the second drive mode, the mounting board having the plurality of electrode portions surrounding the resonator, and the actuator that excites the resonator in the z-axis direction. In this inertial sensor, the resonator is vibrated in the z-axis direction by the actuator vibrating in the z-axis direction orthogonal to the planar direction of the mounting board, not by an external force along the planar direction, that is, the xy plane direction, and a resonance mode is caused. Therefore, the inertial sensor has a configuration in which the actuator can apply vibration energy to the resonator without hindering a rotational direction of vibration when the resonator is driven, which is a direction along the xy plane. Therefore, the inertial sensor can restrict a decrease in the accuracy of angle detection during operation in a whole angle mode.

Embodiments of the present disclosure will be described below with reference to the drawings. In the following embodiments, the same or equivalent parts are denoted by the same reference numerals for description.

First Embodiment

Figure 1:
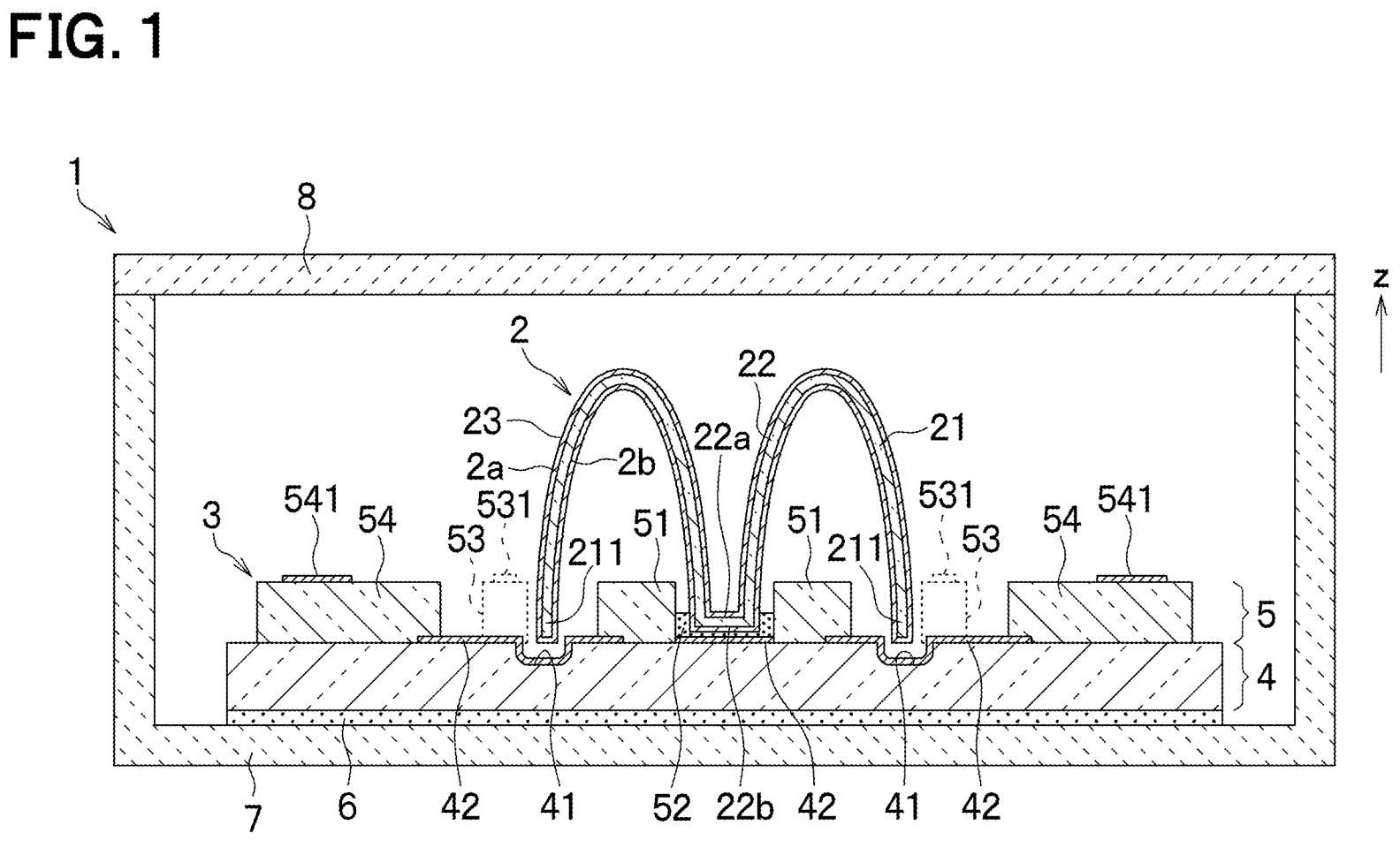

An inertial sensor 1 according to a first embodiment will be described with reference to FIGS. 1 to 5.

In FIG. 1, in order to facilitate understanding of the configuration of the inertial sensor 1, outlines of first electrode portions 53 and electrode films 531, which will be described later, located in another cross section are indicated by broken lines. In FIG. 2, in order to facilitate understanding of the configuration of the inertial sensor 1, a lower substrate 4, an upper substrate 5, and a resonator 2, which will be described later, of the inertial sensor 1 are partially omitted, and a cross-sectional configuration of the resonator 2 is partially illustrated.

Hereinafter, for convenience of description, as shown in FIG. 2, one direction of a planar direction of a mounting board 3 is referred to as an "x-axis direction", a direction orthogonal to the x-axis direction on the same plane is referred to as a "y-axis direction", and a normal direction with respect to an xy plane is referred to as a "z-axis direction". A direction along the xy plane direction may be referred to as a "horizontal direction". The x, y, and z-axis directions in the drawings other than FIG. 2 correspond to the x, y, and z-axis directions in FIG. 2, respectively. Further, in the present specification, "upper" or "upward" represents a direction along the z-axis direction in the view and represents a direction along the arrow, and "lower" or "downward" represents the opposite direction to the upper or upward. Furthermore, in the present description, a state in which the inertial sensor 1, the resonator 2, or the mounting board 3 is viewed from the upper side in the z-axis direction may be referred to as a "top view".

[Basic Configuration]

A basic configuration of the inertial sensor 1 of the present embodiment will be described. For example, as shown in FIG. 1, the inertial sensor 1 includes the resonator 2, the mounting board 3, an actuator 6, a housing 7, and a lid member 8. The resonator 2, the mounting board 3, and the actuator 6 are accommodated in the housing 7 and covered with the lid member 8. The inertial sensor 1 can detect an angular velocity applied to the inertial sensor 1 and a rotation angle based on a change in capacitance between a part of the resonator 2 capable of vibrating in a first drive mode and a second drive mode to be described later and the first electrode portions 53 of the mounting board 3. In the present specification, a case where the inertial sensor 1 is configured as a whole angle mode gyro sensor will be described as a representative example. Note that the whole angle mode can also be referred to as an integral gyro, and may be hereinafter referred to as "WA".

Figure 3:
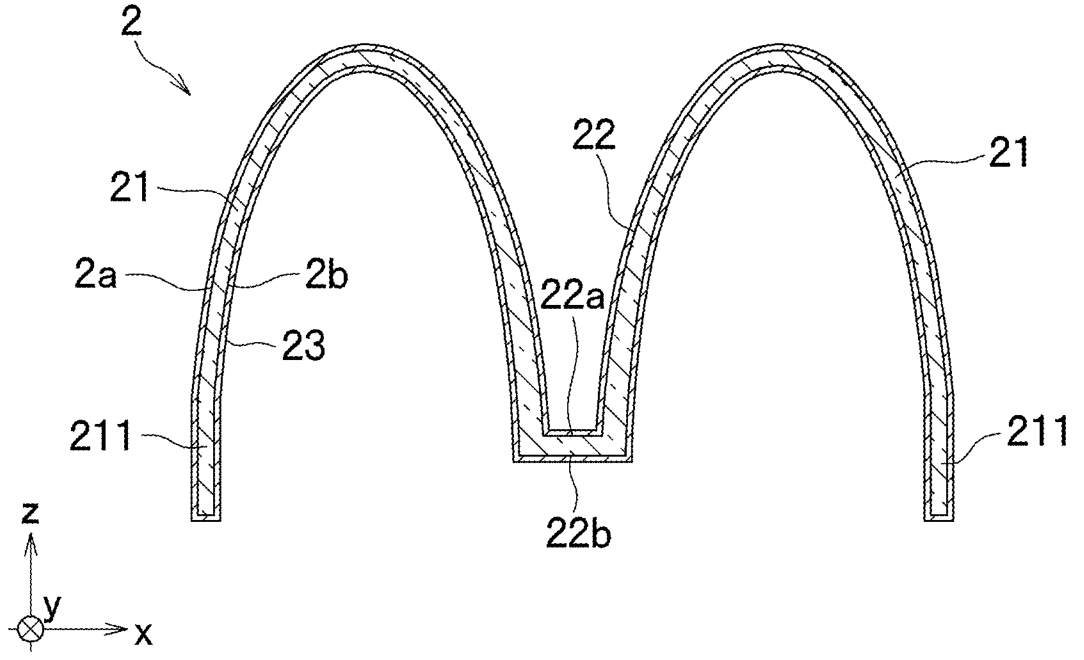
FIG. 3 is a cross-sectional view showing an example of a resonator mounted on the inertial sensor in FIG. 1.

In the present embodiment, for example, as shown in FIG. 3, the resonator 2 is a micro vibrator having a three-dimensional symmetric structure including a curved surface portion 21 and a connection portion 22. The curved surface portion 21 has an outline defined by a three-dimensional curved surface having a hemispherical shape. In the present disclosure, the term "hemispherical shape" includes a substantially hemispherical shape. The connection portion 22 extends from a vertex of the substantially hemispherical shape formed by the curved surface portion 21 toward the center of the hemispherical shape. In the resonator 2, the curved surface portion 21 has, for example, a bowl-shaped three-dimensional curved surface. The resonator 2 exhibits a Q factor of the vibration that is 105 or more.

In the resonator 2 of the present embodiment, for example, a base portion having the curved surface portion 21 and the connection portion 22 is formed of a reflow material made of glass with additive, metal glass, silicon, or the like. Examples of glass with additive include quartz glass and borosilicate glass. The base portion of the resonator 2 may be formed of a reflow material that is capable of forming the curved surface portion 21 having a three-dimensional curved surface and the connection portion 22 and is capable of vibrating in a wine-glass mode or an n=2 mode to be described later, and is not limited to the above-described material examples. The resonator 2 is a thin member and is formed, for example, by processing a thin base made of the material described above in a formation process described later, so that the curved surface portion 21 and the connection portion 22 are thin on the order of micrometers, such as in a range from 10 micrometers (μm) to 100 μm. A dimension of the resonator 2 in a direction along a thickness direction of the mounting board 3, that is, a direction orthogonal to the planar direction of the mounting board 3 is referred to as a height. The resonator 2 has a bird bath shape in a millimeter-size. For example, the height of the resonator 2 is 2.5 mm, and an outer diameter of a rim 211 defined by a front surface **2*a*** is 5 mm.

When the resonator 2 is manufactured, for example, a quartz plate having a thickness of 100 μm or less is set in a mold (not shown) including a concave portion and a support portion that supports a part of the quartz plate at the center of the concave portion when the quartz plate is heated and softened, and the inside of the concave portion is vacuumed while the quartz plate is softened by heating means such as flame. Accordingly, the curved surface portion 21 is formed. For example, in this step, a portion of the quartz plate supported by the support portion of the mold (not shown) becomes the connection portion 22 having a bottomed cylindrical shape recessed with respect to the curved surface portion 21, and a portion protruding outward from the concave portion remains without being processed, but is removed in a subsequent step. Then, for example, the concave portion of the mold (not shown) is returned to normal pressure, the quartz plate on which the curved surface portion 21 having the hemispherical shape is removed from the mold, and the quartz plate is sealed with a sealing material made of any curable resin material. Thereafter, for example, unnecessary portions of the quartz plate after processing the sealing material are removed by polishing and chemical mechanical polishing (CMP), and then the sealing material is completely removed by any method such as heating or a chemical solution, and the quartz plate is taken out. The base portion of the resonator 2 is manufactured by, for example, the manufacturing process as described above, but the present disclosure is not limited to this manufacturing method, and other methods may be adopted. For example, the base portion of the resonator 2 may be formed by removing an unnecessary portion outside the curved surface portion 21 by laser processing without sealing the quartz plate in which the curved surface portion 21 and the connection portion 22 are formed. Thereafter, the resonator 2 can be manufactured by forming a surface electrode 23 on the base portion of the resonator 2 by any film forming method.

An end of the curved surface portion 21 opposite to the connecting portion 22 is referred to as the rim 211. The rim 211 has, for example, a substantially cylindrical shape. Here, the term "substantially cylindrical shape" includes not only a cylindrical shape in which the diameter from an upper end to a lower end of an outer surface and an inner surface of the rim 211 is the same, but also a cylindrical shape in which the diameter varies from the upper end to the lower end. In other words, the curved surface portion 21 has the rim 211 that is an annular portion having an annular curved shape. When the resonator 2 is mounted on the mounting board 3 with a surface having a larger outer diameter as the front surface 2*a* and a surface opposite to the frost surface 2*a* as a rear surface 2*b*, the front surface 2*a* of the rim 211 faces the first electrode portions 53 of the mounting board 3 at intervals therebetween. The resonator 2 is mounted such that the intervals between the rim 211 and the first electrode portions 53 are equal to each other. When the resonator 2 is mounted on the mounting board 3, the curved surface portion 21 including the rim 211 is in a midair state without contacting other members. In the present embodiment, the resonator 2 has a structure in which the rim 211 in the midair state can vibrate in a wine glass mode when mounted on the mounting board 3, and can also be referred to as a vibrator.

The connection portion 22 is a connection portion connected to another member such as the mounting board 3, and is, for example, a bottomed cylindrical recessed portion. However, the connection portion 22 is not limited thereto, and may have a substantially columnar shape. When the connection portion 22 is a bottomed cylindrical recessed portion, a recessed bottom surface 22*a* on the front surface 2*a* can be, for example, a suction surface used for suction conveyance when the resonator 2 is mounted on the mounting board 3. A surface of the connection portion 22 opposite to the recessed bottom surface 22*a*, that is, a surface on the rear surface 2*b* is a mounting surface 22*b* facing the mounting board 3.

The surface electrode 23 is formed of, for example, but not limited to, a laminated film including an adhesion layer and a conductive payer. The adhesion layer is formed on the front surface 2*a* and the rear surface 2*b* is made of chromium or titanium. The conductive layer is formed on the adhesion layer and is made of any conductive material such as gold or platinum. The front surface electrode 23 is formed on the front surface 2*a* and the back surface 2*b* of the resonator 2 by any film forming method such as sputtering, vapor deposition, CVD, or ALD. CVD is an abbreviation for Chemical Vapor Deposition. ALD is an abbreviation for Atomic Layer Deposition. For example, the surface electrode 23 is formed on at least the mounting surface 22*b* and the front surface 2*a* of the rim 211, and these portions are electrically connected to each other. The surface electrode 23 may have a solid shape that covers the entire front and rear surfaces of the resonator 2, or may have a pattern shape that is patterned by a photolithography etching method or the like and covers a part of the front and rear surfaces. In the resonator 2, for example, a portion of the surface electrode 23 covering the mounting surface 22*b* of the connection portion 22 is connected to the mounting board 3 via a bonding member 52 made of a conductive material.

As shown in FIG. 1, for example, the mounting board 3 includes the lower substrate 4 and the upper substrate 5, which are joined to each other. For example, the mounting board 3 is obtained by performing etching processing and wiring film formation on the lower substrate 4 made of borosilicate glass, which is an insulating material, then anodically bonding the upper substrate 5 made of silicon, which is a semiconductor material, to the lower substrate 4, and performing patterning. The mounting board 3 includes, for example, a plurality of inner frame portions 51, the plurality of first electrode portions 53 disposed apart from each other so as to surround the inner frame portions 51, and a second electrode portion 54 disposed apart from the plurality of first electrode portions 53 and surrounding the first electrode portions 53 on the upper substrate 5. In addition, the mounting board 3 includes, for example, an annular groove 41 surrounding the plurality of inner frame portions 51 while separating the inner frame portion 51 from the plurality of first electrode portions 53, and a plurality of wires 42 straddling the inside and the outside of the groove 41, for example, on the lower substrate 4.

For example, as shown in FIG. 2, the groove 41 is a groove provided between the inner frame portion 51 and the plurality of first electrode portions 53, and is formed by wet etching. The groove 41 has a dimension corresponding to the outer diameter of the rim 211 of the resonator 2, and is provided to prevent the rim 211 from coming into contact with the mounting board 3 when the resonator 2 is mounted on the mounting board 3.

The wires 42 are made of, for example, a conductive material such as aluminum, are disposed to pass between the plurality of first electrode portions 53, and are electrically independent of the plurality of first electrode portions 53. For example, one end of each of the wires 42 is connected to the inner frame portion 51 and the other end is connected to the second electrode portion 54 while straddling the groove 41 in the lower substrate 4, and the wires 42 electrically connect the inner frame portion 51 and the second electrode portion 54. Thus, the mounting board 3 can apply a voltage to the surface electrode 23 of the resonator 2 via the second electrode portion 54, the wires 42, and the inner frame portion 51.

The inner frame portion 51 is formed together with the plurality of first electrode portions 53 and the second electrode portion 54, for example, by performing dry etching such as DRIE on the upper substrate 5 anodically bonded to the lower substrate 4. DRIE is an abbreviation for Deep Reactive Ion Etching. The inner frame portion 51 has, for example, an annular shape in the top view, and is configured such that the connection portion 22 of the resonator 2 can be inserted into a region surrounded by the inner frame portion 51. In other words, the inner frame portion 51 has a frame body shape surrounding a bonding region that is a region of the mounting board 3 located immediately below the mounting surface 22*b* of the resonator 2. For example, the resonator 2 is mounted on the mounting board 3 by disposing the bonding member 52 in a region of the mounting board 3 surrounded by the inner frame portion 51, mounting the connection portion 22 of the resonator 2 on the bonding member 52, and heating and solidifying the bonding member 52.

The bonding member 52 is made of, for example, a conductive material such as sintered silver or gold-tin, and fixes the connection portion 22 of the resonator 2 to the mounting board 3. The bonding member 52 fixes the resonator 2 to the mounting board 3 in a state of covering the mounting surface 22*b* of the connection portion 22 and a part of a side surface of the connection portion 22 adjacent to the mounting surface 22*b*. The bonding member 52 may be a conductive material that can be bonded to the resonator 2 and the surface electrode 23, and a conductive material other than the above-described examples may be used.

The first electrode portions 53 are disposed apart from each other, and, for example, as shown in FIG. 1, an electrode film 531 is formed on the upper surface of each of the first electrode portions 53. For example, wires (not shown) are connected to the electrode films 531, so that the first electrode portions 53 are electrically connected to an external circuit board (not shown) to enable control of the potential. For example, the first electrode portions 53 are disposed to be separated from each other at equal intervals so as to form one ring on the xy plane while surrounding the rim 211 of the resonator 2 when viewed from above. When the resonator 2 is mounted, the first electrode portions 53 are separated from the rim 211 of the resonator 2 by a predetermined distance, and form a capacitor with the resonator 2. That is, the mounting board 3 can detect the capacitance between the mounting board 3 and the resonator 2 via the first electrode portions 53. A part of the first electrode portions 53 is used as a detection electrode for detecting the capacitance. The first electrode portions 53 positioned in the direction corresponding to the first drive mode of the resonator 2 are used as first detection electrodes, and the first electrode portions 53 positioned in the direction corresponding to the second drive mode are used as second detection electrodes.

The second electrode portion 54 has, for example, one frame shape surrounding the inner frame portion 51 and the first electrode portions 53 disposed around the inner frame portion 51 in the top view. The second electrode portion 54 includes, for example, at least one electrode film 541 made of aluminum or the like on an upper surface, and a wire (not shown) is connected to the electrode film 541. The second electrode portion 54 may be connected to the surface electrode 23 of the resonator 2 via at least the wires 42, and may have a configuration capable of applying a voltage. The second electrode portion 54 may have a shape other than the frame shape, or a plurality of second electrode portions 54 may be disposed.

The actuator 6 is a driving device that vibrates the resonator 2 in the z-axis direction, and is, for example, a piezoelectric, electrostatic, or electromagnetic element that can vibrate in the z-axis direction. In the present embodiment, for example, the actuator 6 is separately manufactured by a known actuator manufacturing method as a body separated from the mounting board 3, and is disposed on an inner bottom surface of the housing 7. The actuator 6 is connected to, for example, a wire (not shown) provided in the housing 7, and can vibrate in the z-axis direction by voltage application from an external power supply. The mounting board 3 is bonded to a surface of the actuator 6 opposite to a surface facing the housing 7 by an adhesive layer (not shown), and the actuator 6 vibrates the resonator 2 bonded to the mounting board 3 in the z-axis direction. The actuator 6 has, for example, substantially the same planar size as that of the mounting board 3, and the mounting board 3 is bonded to the actuator 6 with the outlines thereof in the xy plane aligned with each other. However, the present disclosure is not limited thereto, and the actuator 6 may have a planar size larger than that of the mounting board 3, and a part of the actuator 6 may protrude from the mounting board 3.

Hereinafter, for convenience of description, a vibration mode in which the number of antinodes and the number of nodes in the vibration amplitude of the rim 211 are the same at n (n: an integer of 2 or more) in the top view when resonator 2 is vibrated in the planar direction is referred to as a "planar resonance mode". In the planar resonance mode, the resonator 2 vibrates along the planar direction of the xy-axis direction and also vibrates in the z-axis direction. When the resonator 2 is vibrated in the z-axis direction, vibration in the xy plane direction is excited. The actuator 6 serves to vibrate the resonator 2 in the z-axis direction to excite vibration in the horizontal direction and generate a resonance mode corresponding to the planar resonance mode. Hereinafter, excitation of the resonator 2 in the z-axis direction by the actuator 6 is referred to as "z-axis excitation", and a resonance mode corresponding to the planar resonance mode and generated in the resonator 2 by the z-axis excitation is referred to as "z-axis resonance mode". Details of the z-axis resonance mode of the resonator 2 by the actuator 6 will be described later.

The housing 7 is, for example, a package member in which a base portion is made of an insulating material such as ceramic and at least the resonator 2 and the mounting board 3 are accommodated. The housing 7 has, for example, electrode pads, internal wires, and external terminals (not shown), and is connected to the first electrode portions 53 and the second electrode portion 54 of the mounting board 3 and the actuator 6 by wires or the like, and has a structure capable of electrically connecting these members to the external power supply.

The lid member 8 is a member that is attached to the housing 7 with an adhesive (not shown) and covers the opening portion of the housing space of the resonator 2 and the mounting board 3 in the housing 7. The lid member 8 may be made of, for example, the same insulating material as that of the housing 7, or may be made of an insulating material different from that of the housing 7. In the present embodiment, the lid member 8 constitutes, together with the housing 7, a package member that encloses the resonator 2, the mounting board 3, and the actuator 6 of the inertial sensor 1.

The above is the basic configuration of the inertial sensor 1.

[Excitation of Resonator]

Next, the z-axis excitation and a z-axis vibration mode of the resonator 2 by the actuator 6 will be described with reference to FIGS. 4A to 4F.

Figure 4A:
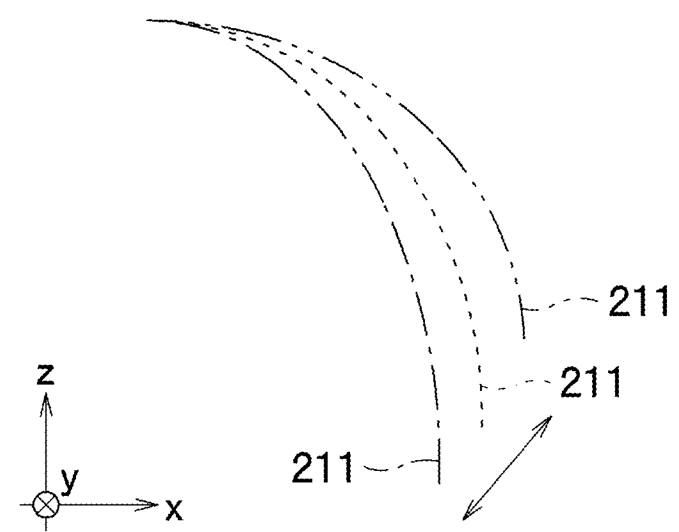
FIG. 4A is a diagram for explaining a vibration state of the resonator in FIG. 3 at the time of operation.
Figure 4B:
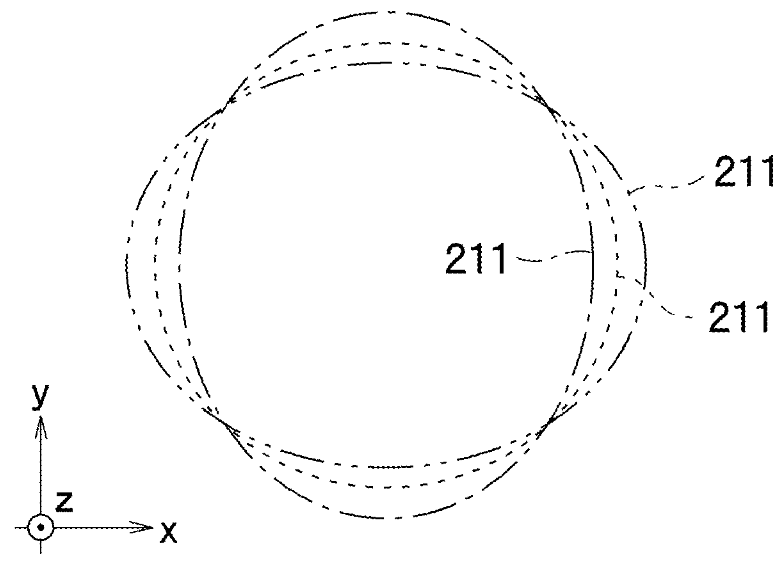
FIG. 4B is a top view showing the vibration state of the resonator in FIG. 4A.
Figure 4C:
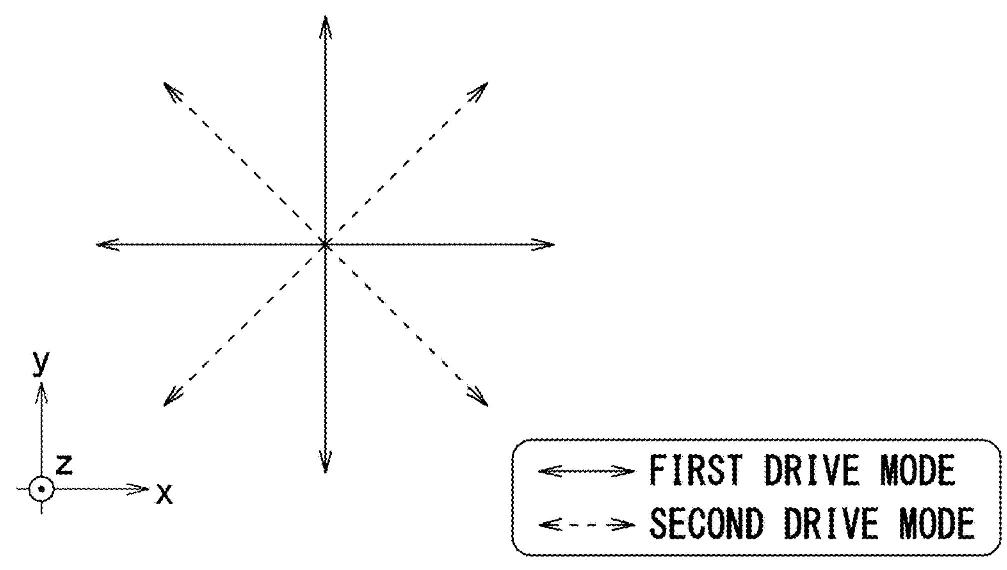
FIG. 4C is a diagram for explaining a first drive mode and a second drive mode in the vibration state of the resonator.
Figure 4D:
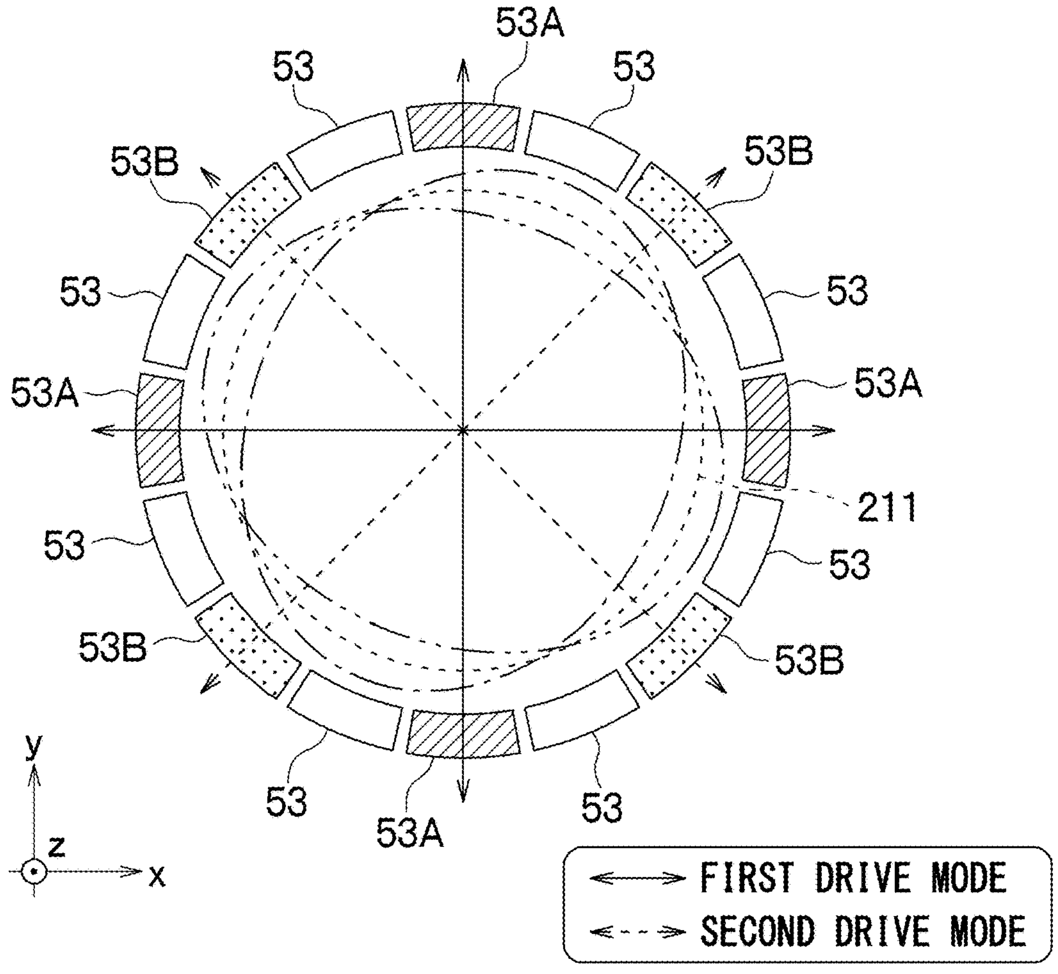
FIG. 4D is a diagram showing examples of a vibration mode, two drive modes in the vibration mode, and detection electrodes of the resonator in the inertial sensor in FIG. 1.

In FIGS. 4A, 4B, 4D, and 4E, for ease of viewing, only a part of the resonator 2 including the rim 211 is illustrated in a simplified manner, and the outline of the part in the z-axis vibration mode is indicated by any of a broken line, a one-dot chain line, and a two-dot chain line. In FIG. 4D, in order to facilitate understanding of the first detection electrodes 53A and the second detection electrodes 53B which will be described later, the detection electrodes 53A and 53B are hatched although a cross section is not illustrated.

For example, the resonator 2 can be vibrated in the xy plane direction, that is, the horizontal direction by applying an electrostatic force from some of the first electrode portions 53, and can be set to the planar resonance mode. However, in the inertial sensor 1, during the whole angle operation, the resonator 2 is set to the z-axis resonance mode similar to the planar resonance mode by vibrating the actuator 6 in the z-axis direction instead of the external force along the horizontal direction such as the electrostatic force from the first electrode portions 53.

Specifically, for example, as shown in FIG. 4A, the resonator 2 is vibrated in the z-axis direction by the actuator 6, and the curved surface portion 21 including the rim 211 is displaced in the vertical direction. At this time, for example, as shown in FIG. 4B, assuming that the y-axis direction is vertical and the x-axis direction is horizontal, the rim 211 of the resonator 2 is in a vibration state in which displacement in the horizontal direction indicated by a two-dot chain line and displacement in the vertical direction indicated by a one-dot chain line are alternately repeated in association with the vertical displacement along the z-axis direction. That is, when the resonator 2 is vibrated in the z-axis direction by the actuator 6, the vibration of the rim 211 in the horizontal direction is excited. The z-axis resonance mode of resonator 2 shown in FIG. 4B is a standing wave vibration pattern in which antinodes and nodes in the vibration amplitude of the rim 211 are the same at n=2 in the top view. Hereinafter, the z-axis resonance mode shown in FIG. 4B is referred to as "n=2 mode".

For example, when the resonator 2 is excited in the z axis at a resonance frequency at which the planar resonance mode in which the antinodes and the nodes in the amplitude of the rim 211 are n=2 is generated, the resonator 2 is in a vibration state of the n=2 mode. In the standing wave vibration pattern of the n=2 mode, for example, as shown in FIG. 4, in the top view, a first drive mode in a vibration direction indicated by a solid arrow and a second drive mode in a vibration direction indicated by a broken arrow occur in the resonator 2. In the n=2 mode, the second drive mode occurs in a direction inclined by 45 degrees with respect to the direction of the first drive mode. In the n=2 mode, for example, as shown in FIG. 4D, some of the first electrode portions 53 positioned in the direction of the first drive mode are set as the first detection electrodes 53A, and some of the first electrode portions 53 positioned in the direction of the second drive mode are set as the second detection electrodes 53B, so that the rotation angle during the whole angle operation can be detected.

Figure 4E:
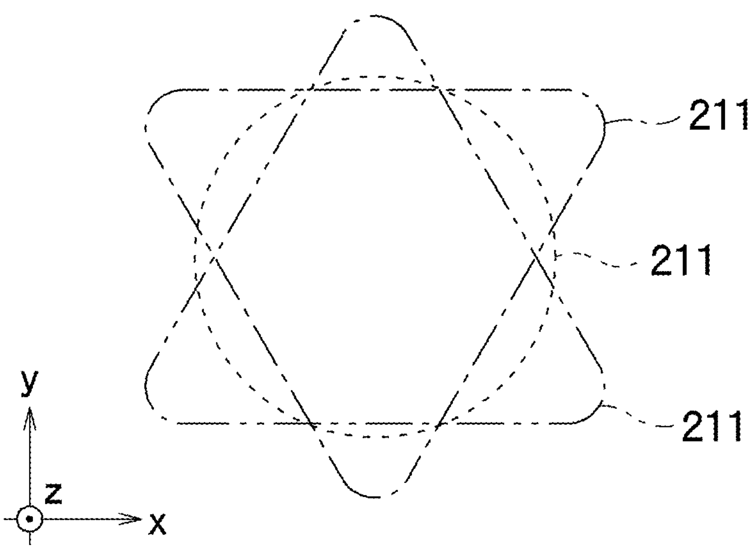
FIG. 4E is a top view showing another vibration state of the resonator.
Figure 4F:
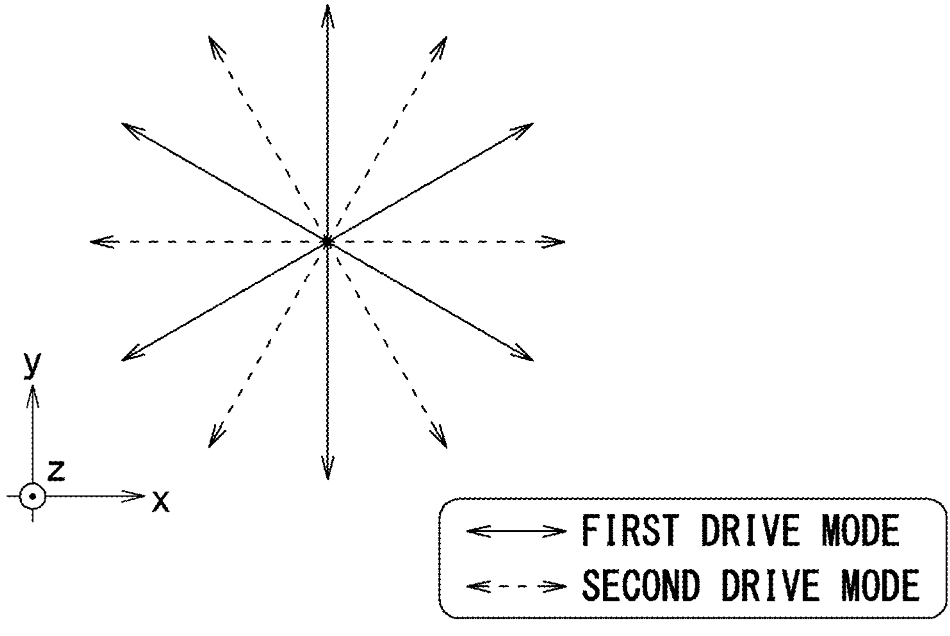
FIG. 4F is a diagram showing two drive modes in the vibration state of the resonator in FIG. 4E.

Note that, in the resonator 2, the z-axis resonance mode during the whole angle operation is not limited to n=2. For example, as shown in FIG. 4E, the z-axis resonance mode may be a resonance mode in which antinodes and nodes in the amplitude of the rim 211 are n=3 in the top view, or may be a higher-order resonance mode. In the resonance mode of n=3, for example, as shown in FIG. 4F, the second drive mode in the vibration direction indicated by the broken-line arrow occurs in a direction inclined by 30 degrees with respect to the direction of the first drive mode in the vibration direction indicated by the solid-line arrow.

In the whole angle operation, the inertial sensor 1 drives the actuator 6 to set the resonator 2 in the z-axis excitation mode, thereby generating the first drive mode and the second drive mode. At this time, in a state in which no rotation is applied to the inertial sensor 1, the vibration directions in the first drive mode and the second drive mode remain linear and do not change, for example, as indicated by double-headed arrows in FIG. 4C. On the other hand, when rotation is applied to the inertial sensor 1 in which the resonator 2 is in the z-axis excitation mode, the vibration direction of the resonator 2 rotates. At this time, in the inertial sensor 1, the vibration amplitude, the quadrature error, the vibration direction, and the phase difference φ of the resonator 2 can be calculated from the detection signal according to the change in the capacitance between the resonator 2 and the detection electrodes 53A and 53B. In the inertial sensor 1, for example, maintenance control of the resonance frequency in the z-axis excitation mode is performed based on the phase difference q detected by the control circuit 10 described below.

[Control Circuit for Whole Angle Operation]

Next, an example of the control circuit 10 used for processing in a whole angle operation mode in the inertial sensor 1 will be described with reference to FIG. 5.

For example, as shown in FIG. 5, the control circuit 10 includes a whole angle calculation unit (WACU) 11 that executes various calculations in the whole angle operation mode, a PLL 12 for maintaining the z-axis resonance mode of the resonator (RES) 2, and a drive circuit (DRC) 152 that inputs a drive signal to the actuator 6. Note that PLL is an abbreviation for Phase Locked Loop. The PLL 12 maintains a constant phase difference between the input signal to the actuator 6 and the output signal of the amplitude.

The control circuit 10 further includes, for example, an oscillator (OSC) 153 that controls an oscillation frequency based on a signal from the PLL 12, PIDs 131 and 132 that correct a signal from the whole angle calculation unit 11, and a modulation unit (MDU) 14 that modulates signals from the oscillator 153 and the PIDs 131 and 132. PID is an abbreviation for Proportional Integral Differential. The PID 131 performs correction for making the vibration amplitude of the resonator 2 constant, and inputs the corrected signal to the modulation unit 14. The PID 132 corrects the quadrature error in the z-axis resonance mode of the resonator 2 to zero, and inputs the corrected signal to the modulation unit 14. The control circuit 10 further includes, for example, a DAC 151 that converts a digital signal output from the modulation unit 14 into an analog signal, and the drive circuit 152 inputs a drive signal to the actuator (ACT) 6 based on the analog signal input from the DAC 151. DAC is an abbreviation for Digital to Analog Converter.

The control circuit 10 further includes, for example, detection circuits (DTC) 161 and 162 that detect electrostatic capacitances between the resonator 2 and some of the detection electrodes of the first electrode portions 53, and ADCs 171 and 172 that convert analog signals from the detection circuits 161 and 162 into digital signals. The control circuit 10 further includes, for example, demodulation units (DMU) 181 and 182 that demodulate the digital signals from the ADCs 171 and 172 and the input signal from the oscillator 153, and the detection signal from the resonator 2 is input to the whole angle calculation unit 11 via the demodulation units 181 and 182. ADC is an abbreviation for Analog to Digital Converter.

The whole angle calculation unit 11 includes, for example, an energy calculation unit (ECU) 111, a quadrature calculation unit (QCU) 112, an angle calculation unit (ACU) 113, and a phase calculation unit (PCU) 114. The energy calculation unit 111 calculates the vibration amplitude of the resonator 2. The quadrature calculation unit 112 performs calculation for making the quadrature error in the z-axis resonance mode of the resonator 2 zero. The angle calculation unit 113 calculates an angle θ of the rotation applied to the inertial sensor 1 during the whole angle operation. The phase calculation unit 114 calculates a phase of the signal input to the actuator 6 and a phase of the vibration amplitude of the resonator 2. The whole angle calculation unit 11 outputs, for example, a signal corresponding to the calculation result of the energy calculation unit 111 to the PID 131, a signal corresponding to the calculation result of the quadrature calculation unit 112 to the PID 132, and a signal corresponding to the calculation result of the phase calculation unit 114 to the PLL 12.

When the amplitude amount of the vibration of the resonator 2 is E and the quadrature error is Q, the amplitude amount E, the quadrature error Q, the rotation angle θ, and the phase difference q are calculated by, for example, the following Equations 1 to 4, respectively.

$$E = x_c^2 + x_s^2 + y_c^2 + y_s^2 \quad \text{[Equation 1]}$$

$$Q = 2(x_c y_s - x_s y_c) \quad \text{[Equation 2]}$$

$$\theta = \frac{1}{2}\arctan\left(\frac{2(x_c y_c + x_s y_s)}{x_c^2 + x_s^2 - y_c^2 - y_s^2}\right) \quad \text{[Equation 3]}$$

$$\varphi = \frac{1}{2}\arctan\left(\frac{2(x_c x_s + y_c y_s)}{x_c^2 - x_s^2 + y_c^2 - y_s^2}\right) \quad \text{[Equation 4]}$$

In Equations 1 to 4, $x_c$ and $x_s$ are respectively the amplitude of the in-phase component and the amplitude of the 90-degree phase component demodulated at an angular frequency ω of an oscillator by the demodulation unit 181. In Equations 1 to 4, $y_c$ and $y_s$ are respectively the amplitude of the in-phase component and the amplitude of the 90-degree phase component demodulated at an angular frequency ω of an oscillator by the demodulation unit 182.

The above is the basic configuration of the control circuit 10 of the inertial sensor 1. The control circuit 10 is not limited to the example shown in FIG. 5, and may be appropriately changed within a possible range. For example, in the above description, the PLL 12 is configured by a digital circuit block of the control circuit 10, but may be configured by an analog circuit block connected to the resonator 2. If the resonator 2 is configured to be excited in the vibration mode in which the resonator 2 vibrates in the first drive mode or the second drive mode, the inertial sensor 1 operates in principle. Therefore, the actuator 6 does not necessarily need to vibrate at the natural frequency of the resonator 2.

Next, an inertial sensor 100 and a control circuit 110 of the inertial sensor 100 according to a comparative example will be described with reference to FIG. 6 and FIG. 7. Here, differences from the inertial sensor 1 and the control circuit 10 of the inertial sensor 1 will be mainly described.

Figure 6:
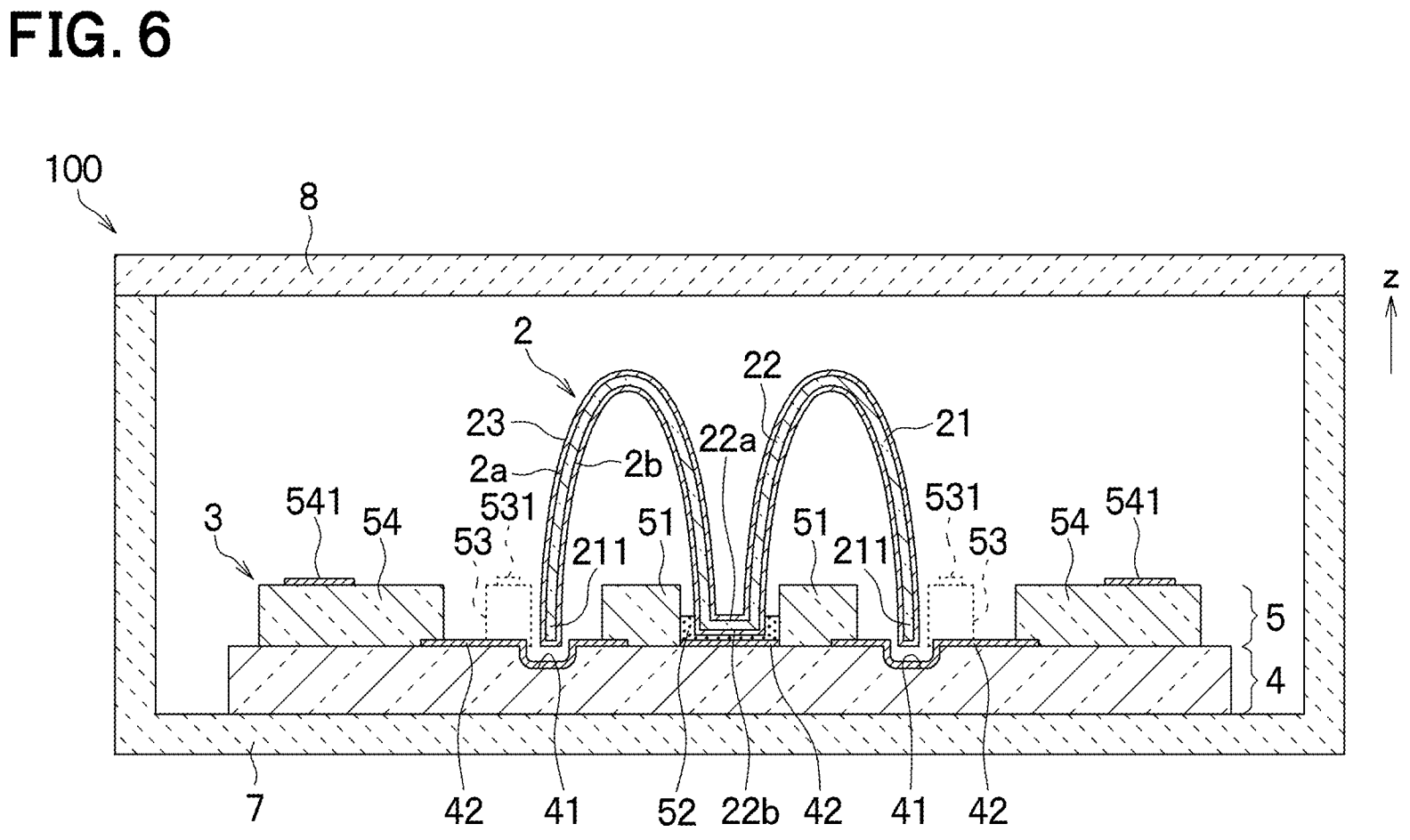

For example, as shown in FIG. 6, the inertial sensor 100 of the comparative example does not include the actuator 6, uses some of the first electrode portions 53 as drive electrodes, and applies an electrostatic force from the drive electrodes to the resonator 2 to set the planar resonance mode. That is, during operation, the inertial sensor 100 of the comparative example applies an external force to the resonator 2 from the xy plane direction, that is, the horizontal direction, and sets the resonator 2 to the planar resonance mode. However, in the inertial sensor 100 of the comparative example, when rotation is applied from the outside, two forces along the horizontal plane, that is, an external force caused by the rotation and an electrostatic force from some of the first electrode portions 53 serving as the drive electrodes are applied to the resonator 2. Since the electrostatic force generated by the drive electrodes is along the same horizontal direction as the external force generated by the rotation, the electrostatic force also affects the rotation of the resonator 2 in the vibration direction. Therefore, in the inertial sensor 100 of the comparative example, when rotation is applied from the outside, in order to maintain the planar resonance mode, it is necessary to perform adjustment in consideration of displacement due to the rotation.

The control circuit 110 is used in the whole angle operation mode. For example, as shown in FIG. 7, the control circuit 110 further includes an angle conversion calculation unit (ACCU) 19 to which signals from the PIDs 131 and 132 and a signal corresponding to the calculation result of the rotation angle θ by the angle calculation unit 113 are input. The angle conversion calculation unit 19 is used to feed back the rotation angle θ calculated by the angle calculation unit 113 to the angle of the vibration standing wave of the resonator 2 in the control for making the amplitude amount of the resonator 2 constant and the control for making the quadrature error zero. The angle conversion calculation unit 19 inputs signals to modulation units (MDU) 141 and 142. The control circuit 110 further includes the modulation unit 142, a DAC 154, and a drive circuit (DRC) 155 in addition to the modulation unit 141, the DAC 151, and the drive circuit 152 in order to apply the electrostatic force from the drive electrodes to the resonator 2 from two or more different directions in the xy plane direction.

The inertial sensor 100 of the comparative example requires feedback of the rotation angle θ as described above, and the detection accuracy of the rotation angle decreases due to the influence of an error in obtaining the direction of the vibration standing wave, a time delay of calculation, a drift due to a drive gain difference between the first drive axis and the second drive axis, and the like. The first drive axis and the second drive axis are drive electrodes corresponding to the first drive mode and drive electrodes corresponding to the second drive mode of the resonator 2, respectively.

In contrast, the inertial sensor 1 has a configuration in which the resonator 2 is set to the z-axis excitation mode by the z-axis excitation using the actuator 6 instead of the first electrode portions 53. That is, in the inertial sensor 1, even when a rotational force along the horizontal direction is applied from the outside and the vibration direction of the resonator 2 rotates, the influence of the actuator 6 vibrating in the z-axis direction on the rotation direction of the vibration is restricted. Furthermore, in the driving of the resonator 2, since the control force by the z-axis excitation of the actuator 6 is directly input in the current vibration direction of the resonator 2, the feedback of the rotation angle during the whole angle operation is not required. Therefore, in the inertial sensor 1, the influence of the error in obtaining the direction of the vibration standing wave, the time delay in calculation, the drift due to the drive gain difference between the first drive axis and the second drive axis, and the like is reduced, and improvement in detection accuracy of the rotation angle is expected.

According to the present embodiment, the inertial sensor 1 can restrict a decrease in the accuracy of the angle detection during the whole angle mode operation.

Second Embodiment

An inertial sensor 1 according to a second embodiment will be described with reference to FIG. 8.

Figure 8:
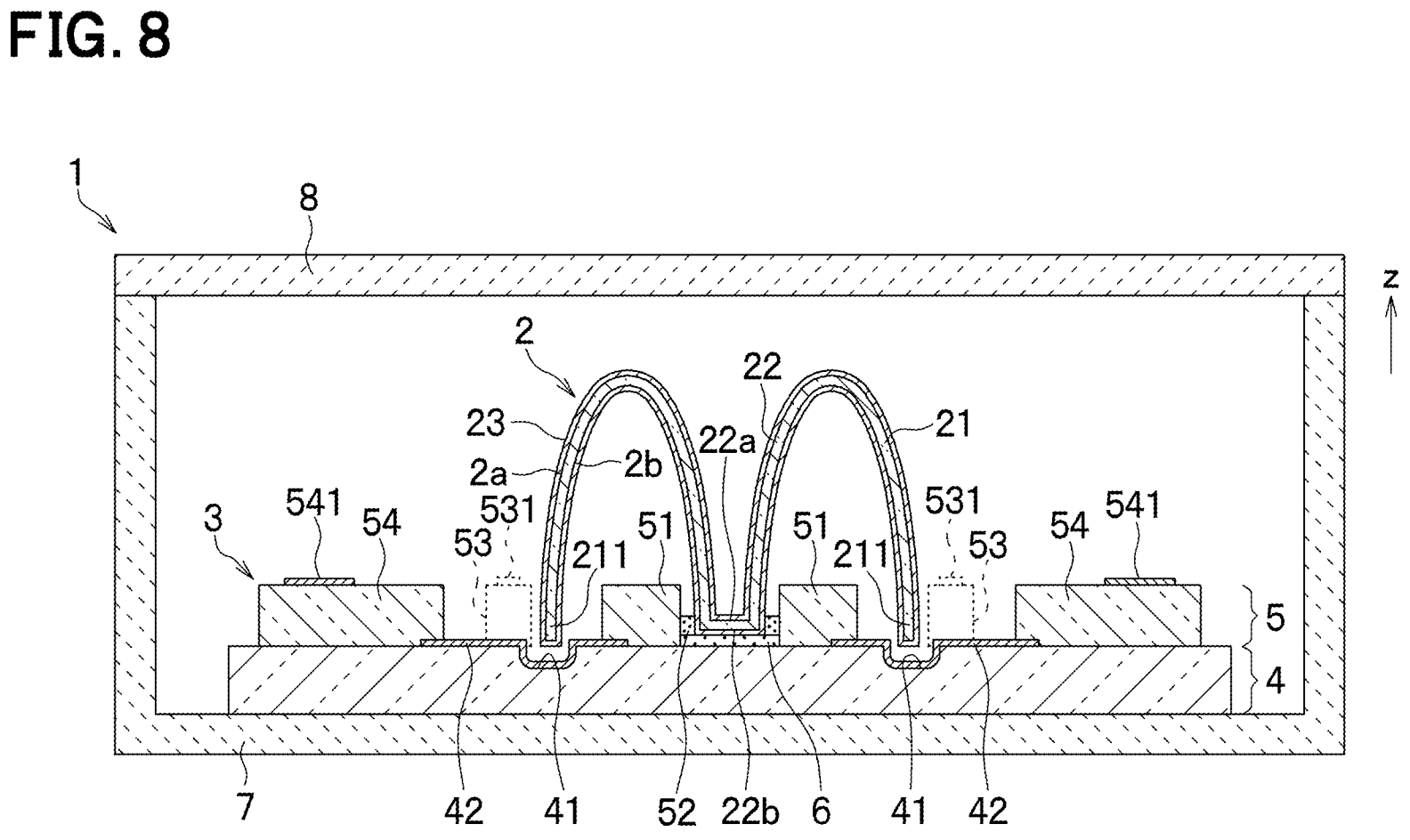

The inertial sensor 1 of the present embodiment is different from that of the first embodiment in that the arrangement of the actuator 6 is changed, for example, as shown in FIG. 8. The following describes the difference between the present embodiment and the first embodiment.

In the present embodiment, for example, as shown in FIG. 8, the actuator 6 is disposed at a portion of the mounting board 3 located immediately below the connection portion 22 of the resonator 2. For example, the actuator 6 is directly formed on the mounting board 3 by a process different from a process of forming the mounting board 3, or is formed separately from the mounting board 3 and disposed on the mounting board 3. In the present embodiment, the actuator 6 is connected to, for example, a wire (not shown) formed on the mounting board 3, and vibrates in the z-axis direction when a drive voltage is applied from an external drive circuit to perform the z-axis excitation of the resonator 2. The actuator 6 is disposed, for example, in a region of the mounting board 3 surrounded by the inner frame portion 51, and is connected to the connection portion 22 of the resonator 2 by the bonding member 52.

The present embodiment also provides the inertial sensor 1 that can achieve effects similar to those of the first embodiment.

Third Embodiment

An inertial sensor 1 according to a third embodiment will be described with reference to FIG. 9.

Figure 9:
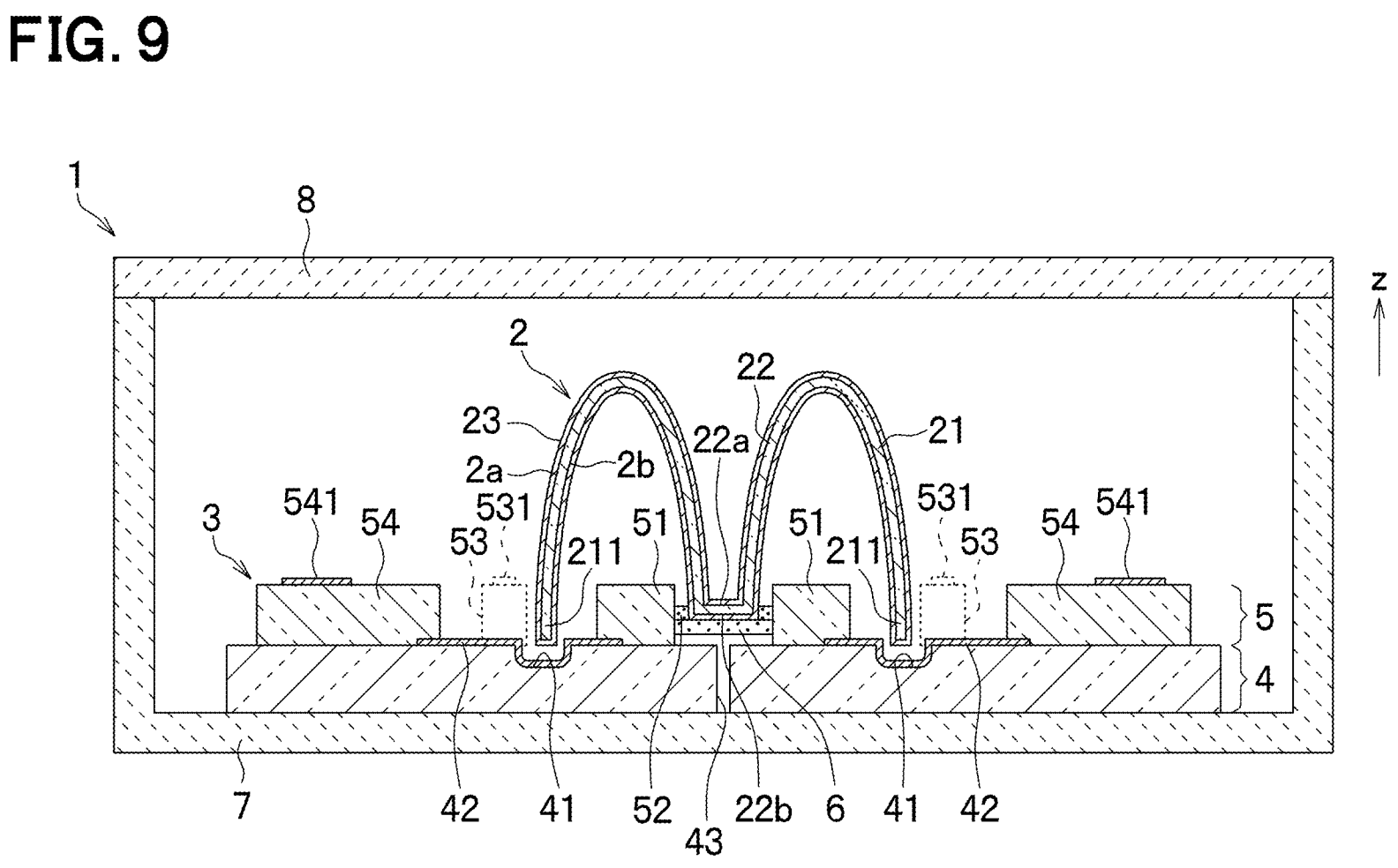

The inertial sensor 1 of the present embodiment is different from that of the first embodiment in that the actuator 6 is configured as a part of the mounting board 3, for example, as shown in FIG. 9. The following describes the difference between the present embodiment and the first embodiment.

In the present embodiment, the actuator 6 is a MEMS actuator formed integrally with the mounting board 3. The MEMS is an abbreviation for Micro Electro Mechanical Systems. In the present embodiment, for example, the actuator 6 is formed on the upper substrate 5 by a semiconductor process, is connected to an external power supply by a wire (not shown) formed on the mounting board 3, and vibrates in the z-axis direction. In the present embodiment, for example, as shown in FIG. 9, the lower substrate 4 has a through hole 43 formed in a region located immediately below the actuator 6, the through hole 43 allowing the outside of the mounting board 3 and the region immediately below the actuator 6 to communicate with each other. The actuator 6 is, for example, a diaphragm type parallel plate device formed integrally with the inner frame portion 51 in a region surrounded by the inner frame portion 51, and is in a midair state not in direct contact with the lower substrate 4. In the present embodiment, the resonator 2 is bonded to the actuator 6 by the bonding member 52, and the actuator 6 vibrates in the z-axis direction to perform the z-axis excitation.

The present embodiment also provides the inertial sensor 1 that can achieve effects similar to those of the first embodiment.

Fourth Embodiment

An inertial sensor 1 according to a fourth embodiment will be described with reference to FIG. 10.

Figure 10:
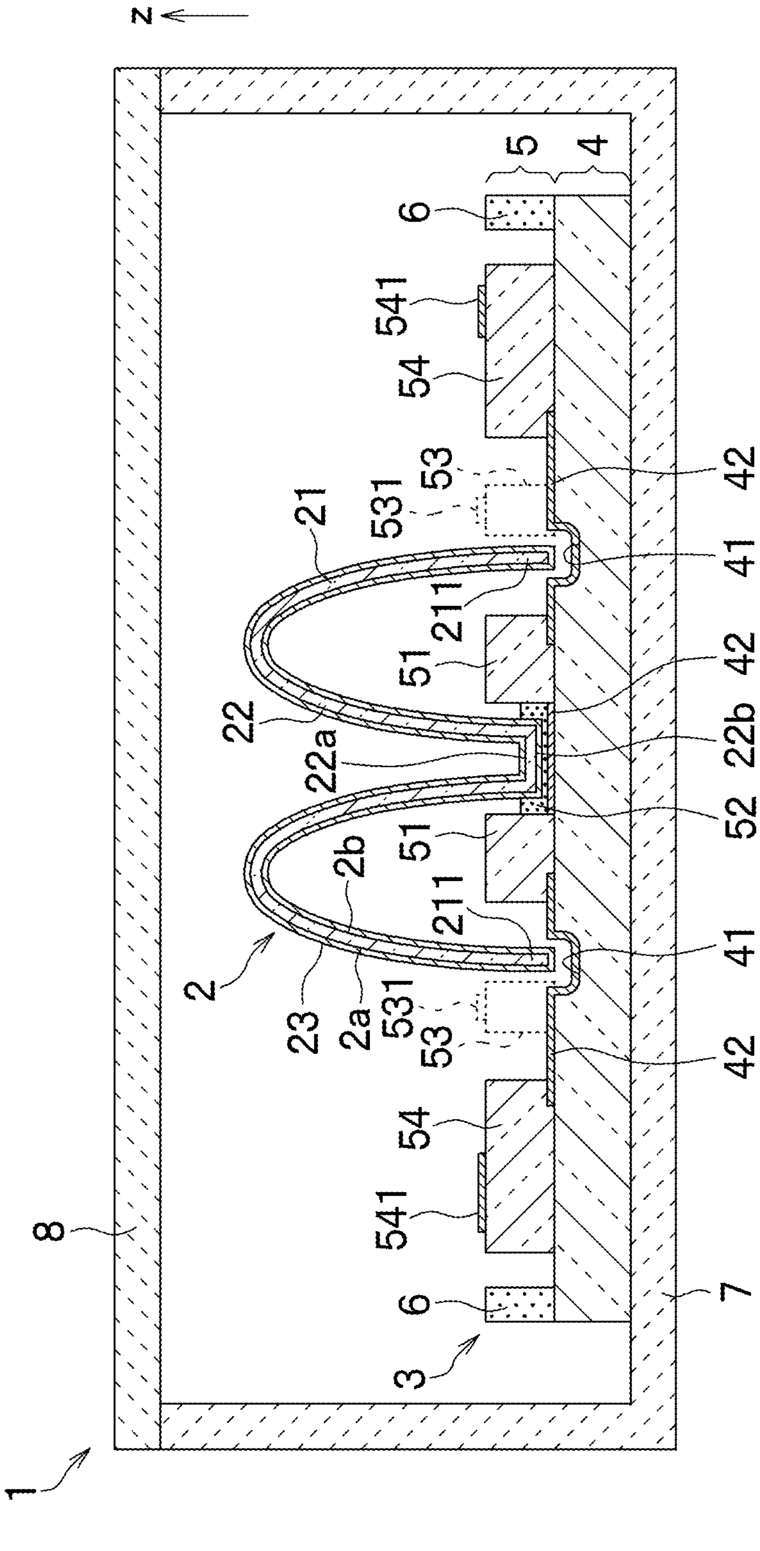
FIG. 10 is a cross-sectional view showing an inertial sensor according to a fourth embodiment.

The inertial sensor 1 of the present embodiment is different from that of the first embodiment in that, for example, as shown in FIG. 10, the actuator 6 is formed on the mounting board 3 and the arrangement is changed. The following describes the difference between the present embodiment and the first embodiment.

In the present embodiment, for example, as shown in FIG. 10, the actuator 6 is formed outside the second electrode portion 54 in the mounting board 3, and is integrated with the mounting board 3. In the present embodiment, the actuator 6 is, for example, an electrostatic silicon actuator mainly made of silicon, and is formed by a semiconductor process. The actuator 6 has, for example, one symmetrical structure such as an annular shape centered on the resonator 2 in the top view, or a structure in which multiple actuators 6 are formed and arranged symmetrically centered on the resonator 2.

The present embodiment also provides the inertial sensor 1 that can achieve effects similar to those of the first embodiment.

Fifth Embodiment

An inertial sensor 1 according to a fifth embodiment will be described with reference to FIG. 11.

Figure 11:
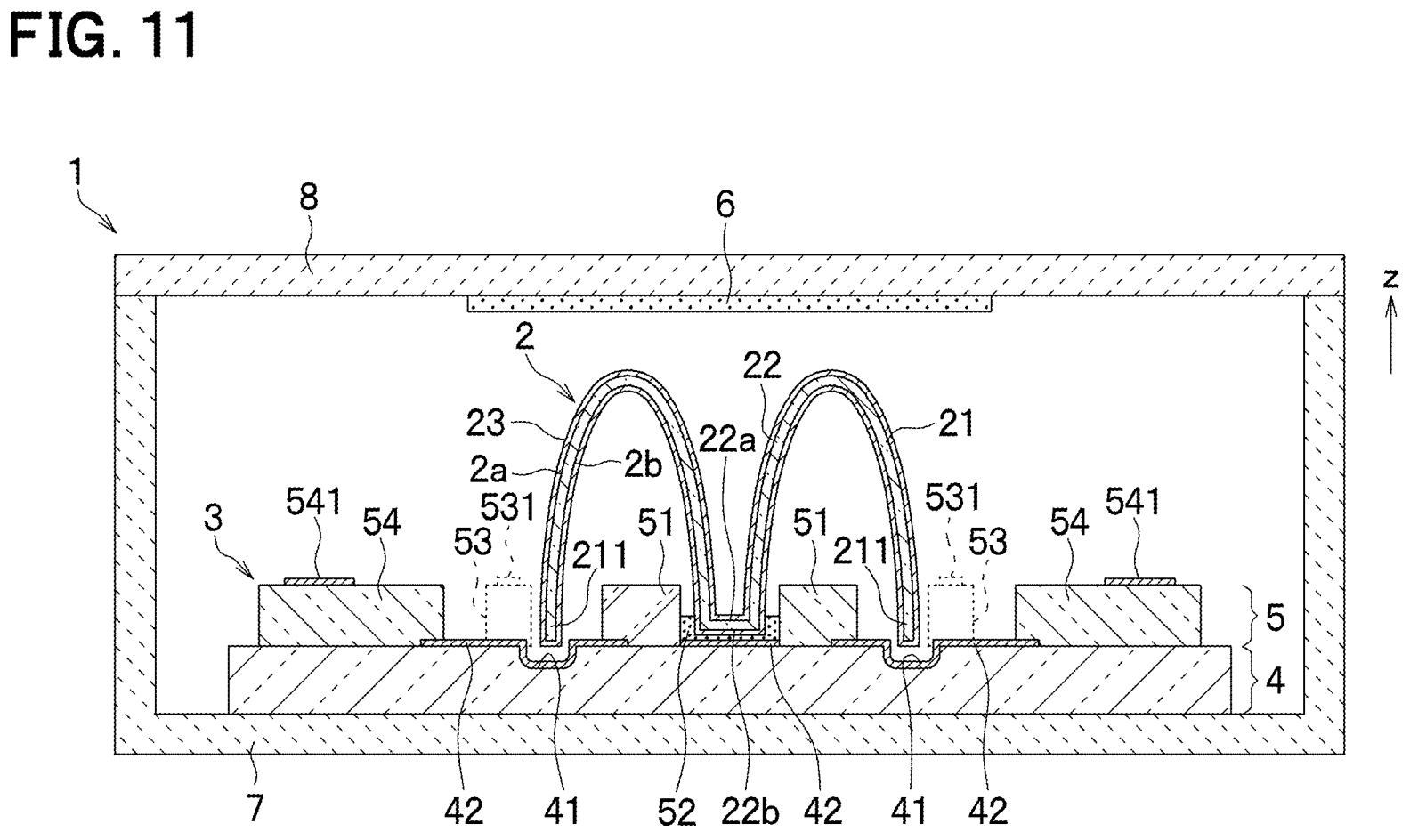

The inertial sensor 1 of the present embodiment is different from that of the first embodiment in that the actuator 6 is attached to a part of the package at a position not in contact with the resonator 2 and the mounting board 3, for example, as shown in FIG. 11. The following describes the difference between the present embodiment and the first embodiment.

In the present embodiment, for example, as shown in FIG. 11, the actuator 6 is disposed on an inner surface of the lid member 8 facing the opening portion of the housing 7. The actuator 6 is attached to the inner surface of the lid member 8 by, for example, an adhesive layer (not shown), and is connected to a wire (not shown) or the like, so that a drive voltage from an external drive circuit can be applied to the actuator 6. In the present embodiment, for example, the actuator 6 vibrates along the z-axis direction on the inner surface of the lid member 8, and performs the z-axis excitation of the entire package and the resonator 2. Alternatively, the actuator 6 may be configured to function as a drive electrode for applying an electrostatic force along the z-axis direction to the resonator 2 and perform the z-axis excitation of the resonator 2.

The present embodiment also provides the inertial sensor 1 that can achieve effects similar to those of the first embodiment.

Sixth Embodiment

An inertial sensor 1 according to a sixth embodiment will be described with reference to FIG. 12.

Figure 12:
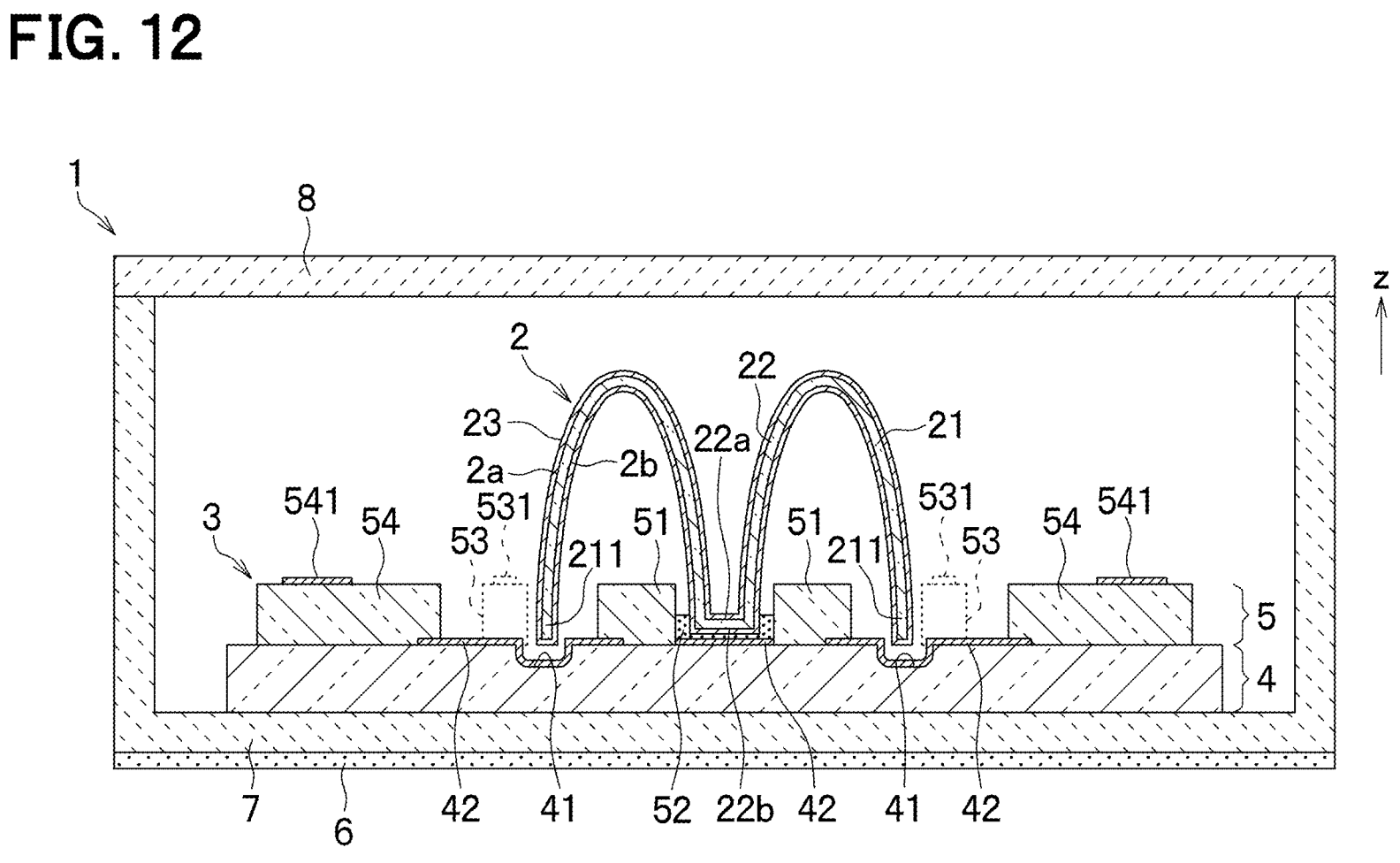

The inertial sensor 1 of the present embodiment is different from that of the first embodiment in that the actuator 6 is attached to an outer surface of the package, for example, as shown in FIG. 12. The following describes the difference between the present embodiment and the first embodiment.

In the present embodiment, for example, as shown in FIG. 12, the actuator 6 is disposed on the outer surface corresponding to the bottom surface of the package. The actuator 6 is attached to, for example, the outer surface of the bottom surface of the housing 7 opposite to the inner surface on which the mounting board 3 is mounted by an adhesive layer (not shown). In the present embodiment, the actuator 6 is connected to, for example, a wire (not shown), and vibrates along the z-axis direction when a drive voltage is applied from an external drive circuit, thereby performing the z-axis excitation of the entire package and the resonator 2. The actuator 6 is not limited to have the same planar size as the bottom surface of the housing 7, and may have a planar size smaller than the bottom surface and be attached to a part of the bottom surface. The dimensions, arrangement, and the like of the actuator 6 can be appropriately changed.

The present embodiment also provides the inertial sensor 1 that can achieve effects similar to those of the first embodiment.

Seventh Embodiment

An inertial sensor 1 according to a seventh embodiment will be described with reference to FIG. 13.

Figure 13:
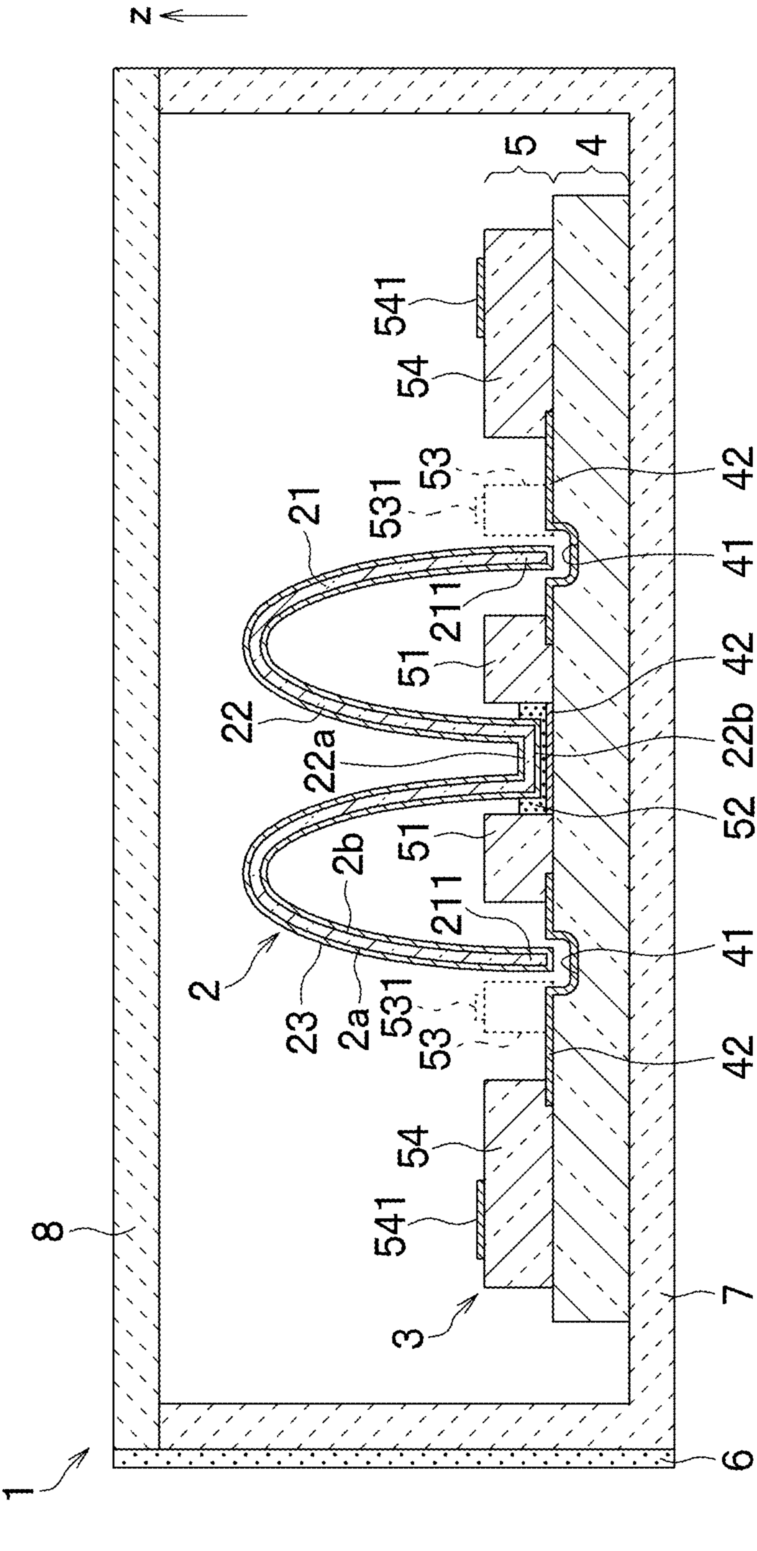
FIG. 13 is a cross-sectional view showing an inertial sensor according to a seventh embodiment.

The inertial sensor 1 of the present embodiment is different from that of the first embodiment in that the actuator 6 is attached to the outer surface of the package, for example, as shown in FIG. 13. The following describes the difference between the present embodiment and the first embodiment.

In the present embodiment, for example, as shown in FIG. 13, the actuator 6 is disposed on an outer surface corresponding to a side surface of the package. For example, the actuator 6 is attached to the surfaces of the housing 7 and the lid member 8 along the z-axis direction by an adhesive layer (not shown) so as to straddle these surfaces. In the present embodiment, the actuator 6 is connected to, for example, a wire (not shown), and vibrates along the z-axis direction when a drive voltage is applied from an external drive circuit. The actuator 6 vibrates in the z-axis direction on the side surface of the package to perform the z-axis excitation of the entire package and the resonator 2.

It is not necessary that the actuator 6 has the same planar size as the side surface of the package including the housing 7 and the lid member 8 as long as the actuator 6 can perform the z-axis excitation of the resonator 2. The actuator 6 may have a planar size smaller than the side surface. The dimensions, the arrangement, and the like of the actuator 6 can be appropriately changed.

The present embodiment also provides the inertial sensor 1 that can achieve effects similar to those of the first embodiment.

Eighth Embodiment

An inertial sensor 1 according to an eighth embodiment will be described with reference to FIG. 14.

Figure 14:
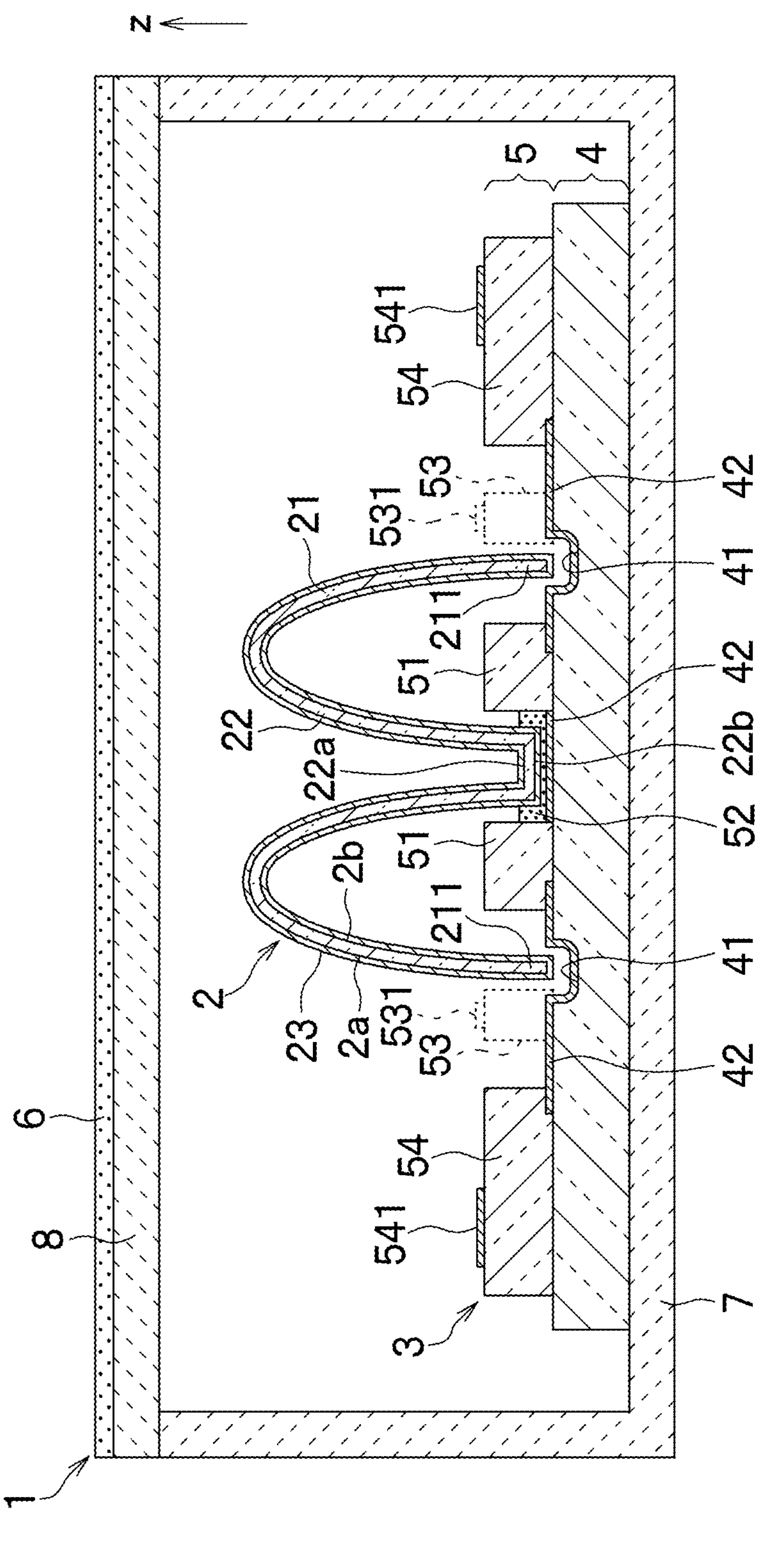
FIG. 14 is a cross-sectional view showing an inertial sensor according to an eighth embodiment.

The inertial sensor 1 of the present embodiment is different from that of the first embodiment in that the actuator 6 is attached to the outer surface of the package, for example, as shown in FIG. 14. The following describes the difference between the present embodiment and the first embodiment.

In the present embodiment, for example, as shown in FIG. 14, the actuator 6 is disposed on an outer surface of the lid member 8 of the package. The actuator 6 is bonded to the outer surface of the lid member 8 by an adhesive layer (not shown) or the like, and vibrates in the z-axis direction to perform the z-axis excitation of the entire package and hence the resonator 2. In the present embodiment, the actuator 6 is connected to, for example, a wire (not shown), and a drive voltage is applied from an external drive circuit. It is not necessary that the planar size of the actuator 6 is the same as that of the lid member 8 as long as the actuator 6 can perform the z-axis excitation of the resonator 2. The planar size of the actuator 6 may be smaller than that of the lid member 8 as in the fifth embodiment.

The present embodiment also provides the inertial sensor 1 that can achieve effects similar to those of the first embodiment.

Ninth Embodiment

An inertial sensor 1 according to a ninth embodiment will be described with reference to FIGS. 15 to 17.

Figure 16:
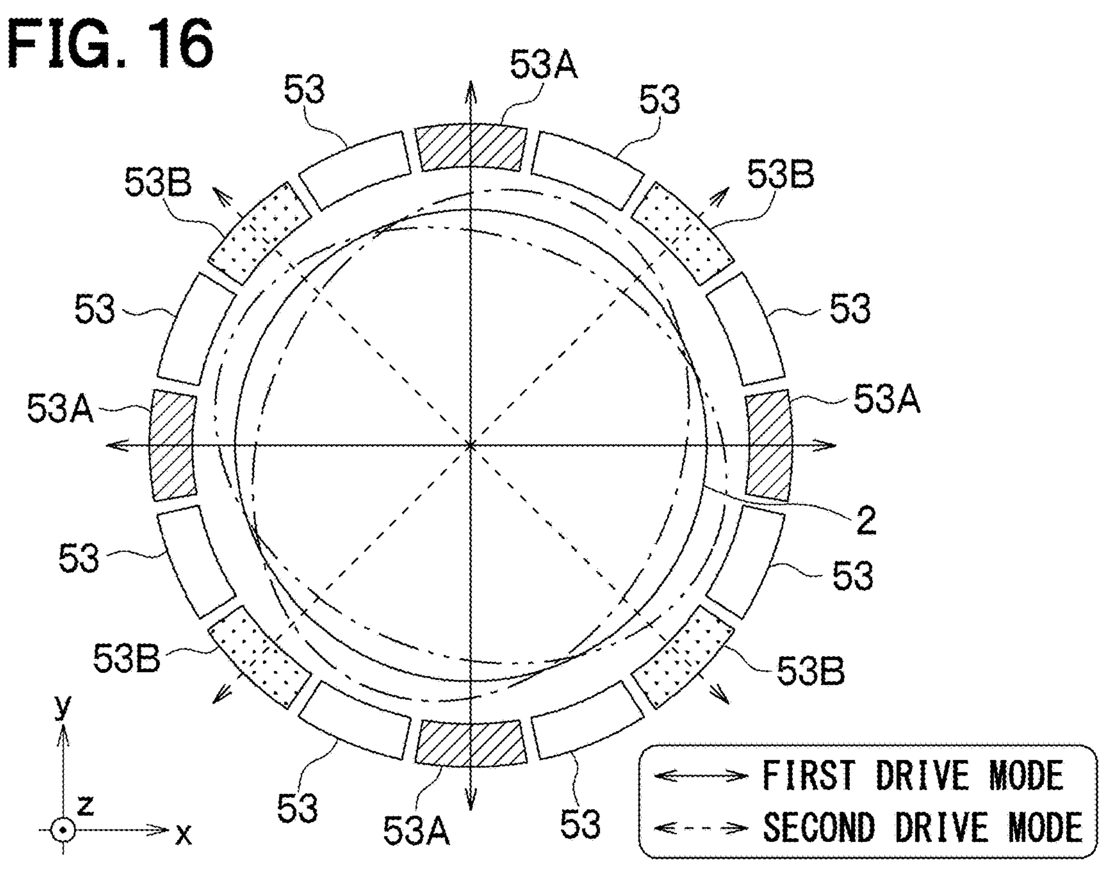
FIG. 16 is a diagram showing examples of a vibration mode, two drive modes in the vibration mode, and detection electrodes of the resonator in the inertial sensor in FIG. 15.
Figure 17:
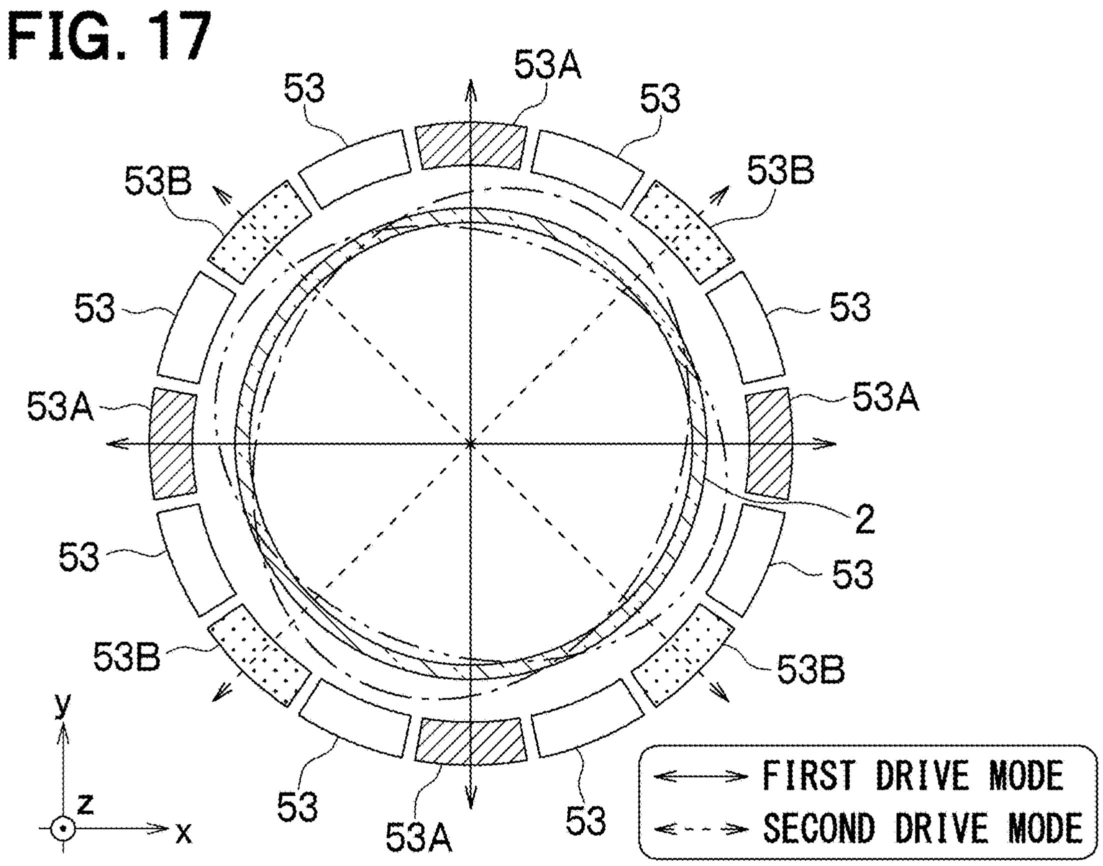
FIG. 17 is a diagram showing examples of a vibration mode, two drive modes in the vibration mode, and detection electrodes of a resonator in an inertial sensor according to a modification of the ninth embodiment.

In FIGS. 16 and 17, similarly to FIG. 4D, the trajectory of the outer portion of the resonator 2 facing the plurality of first electrode portions 53 in the first drive mode is indicated by a one-dot chain line, and the trajectory of the outer portion in the second drive mode is indicated by a two-dot chain line. In addition, in FIGS. 16 and 17, similarly to FIG. 4D, the directions corresponding to the first drive mode of the resonator 2 are indicated by solid arrows, and directions corresponding to the second drive mode of the resonator 2 are indicated by broken arrows. Although FIGS. 16 and 17 do not show cross sections, for ease of understanding, detection electrodes 53A and 53B among the first electrode portions 53 are hatched. In addition, the resonator 2 is hatched in FIG. 17 for the same reason.

Figure 15:
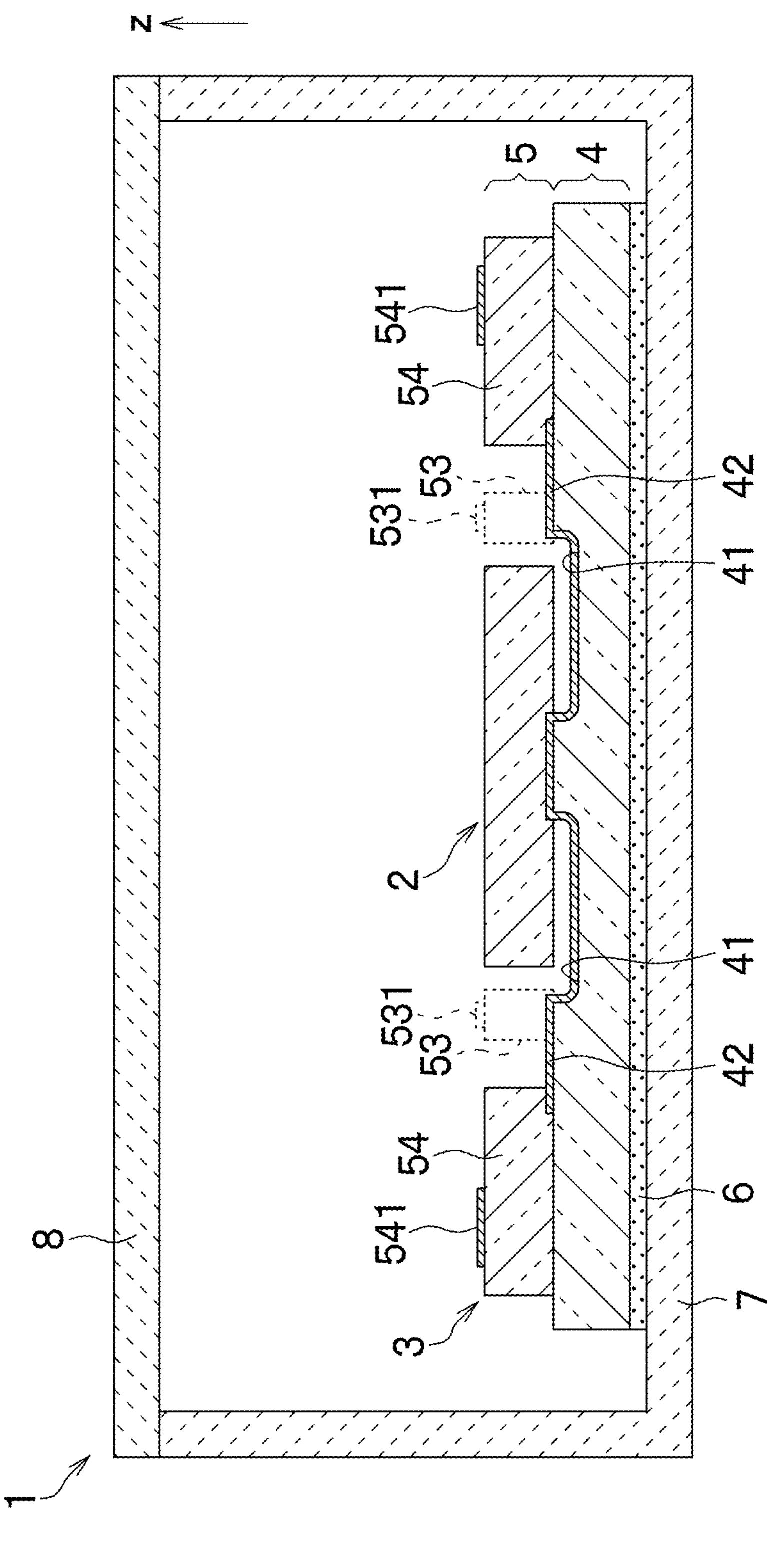
FIG. 15 is a cross-sectional view showing an inertial sensor according to a ninth embodiment.

The inertial sensor 1 of the present embodiment is different from that of the first embodiment in that the resonator 2 has a two-dimensional symmetric structure, for example, as shown in FIG. 15. The following describes the difference between the present embodiment and the first embodiment.

In the present embodiment, for example, as shown in FIGS. 15 and 16, the resonator 2 has a disk-like plate shape, and a central portion of the resonator 2 is connected to the mounting board 3. In the resonator 2, a portion on an outer side in a radial direction with a portion connected to the mounting board 3 as an axis is positioned above the groove 41, and a portion other than the connection portion is in the midair state. In the mounting board 3 of the present embodiment, the width of the groove 41 in the radial direction is larger than that of each of the above embodiments. In the resonator 2, the portion in the midair state is vibrated by the z-axis excitation by the actuator 6, and the vibration state of the first drive mode or the second drive mode shown in FIG. 16 is obtained. Among the first electrode portions 53, some of the first electrode portions 53 located in the vibration direction of the resonator 2 in the first drive mode are the first detection electrodes 53A, and some of the first electrode portions 53 located in the vibration direction of the resonator 2 in the second drive mode are the second detection electrodes 53B.

For example, as shown in FIG. 17, the resonator 2 may have an annular two-dimensional symmetric structure in the top view. In this case, the resonator 2 includes, for example, a support portion (not shown) that is connected to the annular portion and is thinner than the annular portion, the support portion extends to the outside or the inside of the annular portion in a midair state, and an end portion of the support portion is connected and fixed to the mounting board 3. The annular portion of the resonator 2 is in the midair state in which the annular portion is spaced apart from the mounting board 3, and enters the z-axis resonance mode by the z-axis excitation by the actuator 6 as indicated by the one-dot chain line and the two-dot chain line in FIG. 17. At this time, among the first electrode portions 53, the first detection electrodes 53A are positioned on the vibration direction of the first drive mode of the annular portion of the resonator 2, and the second detection electrodes 53B are positioned on the vibration direction of the second drive mode. In the example shown in FIG. 15, the actuator 6 has the same arrangement as that of the first embodiment. However, the arrangement of the actuator 6 is not limited to the example shown in FIG. 15, and may have the same arrangement or configuration as that of any one of the second to eighth embodiments.

The present embodiment also provides the inertial sensor 1 that can achieve effects similar to those of the first embodiment.

Other Embodiments

Although the present disclosure has been made in accordance with the embodiments, it is understood that the present disclosure is not limited to such embodiments and structures. The present disclosure encompasses various modifications and variations within the scope of equivalents. In addition, various combinations and modes, and further, other combinations and modes including one element of these alone, or thereabove, or therebelow, are also comprised within the scope or concept range of the present disclosure.

A controller (for example, the control circuit 10) and the method described in the present disclosure may be implemented by a special purpose computer which is configured with a memory and a processor programmed to execute one or more particular functions embodied in computer programs of the memory. Alternatively, the controller and the method described in the present disclosure may be implemented by a special purpose computer configured as a processor with one or more special purpose hardware logic circuits. Alternatively, the controller and the method described in the present disclosure may be implemented by one or more special purpose computer, which is configured as a combination of a processor and a memory, which are programmed to perform one or more functions, and a processor which is configured with one or more hardware logic circuits. The computer program may be stored, as instructions to be executed by a computer, in a tangible non-transitory computer-readable medium.

The constituent element(s) of each of the above embodiments is/are not necessarily essential unless it is specifically stated that the constituent element(s) is/are essential in the above embodiment, or unless the constituent element(s) is/are obviously essential in principle. A quantity, a value, an amount, a range, or the like referred to in the description of the embodiments described above is not necessarily limited to such a specific value, amount, range or the like unless it is specifically described as essential or understood as being essential in principle. Further, in each of the above embodiments, when the shape of an element or the positional relationship between elements is mentioned, the present disclosure is not limited to the specific shape or positional relationship unless otherwise particularly specified or unless the present disclosure is limited to the specific shape or positional relationship in principle.

What is claimed is:

1. An inertial sensor comprising:

a resonator having a first drive mode and a second drive mode;

a mounting board having a plurality of electrode portions arranged at a distance from each other and surrounding the resonator; and an actuator configured to vibrate in a z-axis direction, the z-axis direction being a direction orthogonal to a planar direction of the mounting board, wherein the actuator is further configured to vibrate the resonator in the z-axis direction to cause a resonance mode.

2. The inertial sensor according to claim 1, wherein the actuator is further configured to vibrate the resonator at a resonance frequency that excites the first drive mode or the second drive mode.

3. The inertial sensor according to claim 2, wherein the mounting board has one surface facing the resonator and an opposite surface that is opposite to the one surface, and the actuator is disposed on the opposite surface of the mounting board.

4. The inertial sensor according to claim 2, wherein the actuator is disposed between the resonator and the mounting board.

5. The inertial sensor according to claim 2, wherein the actuator is configured as a part of the mounting board.

6. The inertial sensor according to claim 2, further comprising:

a housing accommodating the resonator and the mounting board and having an opening portion; and a lid member closing the opening portion of the housing, wherein the actuator is disposed at a position in contact with a part of a package constituted by the housing and the lid member.

7. The inertial sensor according to claim 1, wherein the resonator has a two-dimensional symmetric structure having a circular shape or an annular shape.

8. The inertial sensor according to claim 1, wherein the resonator has a three-dimensional symmetric structure including a curved surface portion and a connection portion, the curved surface portion has a three-dimensional curved surface having a hemispherical shape, and the connection portion extends from the curved surface portion toward a center of the hemispherical shape.

* * * * *